United States Patent
Kessler et al.

(10) Patent No.: US 10,816,795 B2
(45) Date of Patent: Oct. 27, 2020

(54) WEARABLE DISPLAY FOR NEAR-TO-EYE VIEWING

(71) Applicants: David Kessler, New York, NY (US); Adam J. Davis, Rye, NY (US)

(72) Inventors: David Kessler, New York, NY (US); Adam J. Davis, Rye, NY (US)

(73) Assignee: Amalgamated Vision, LLC, Brentwood, TN (US)

( * ) Notice: Subject to any disclaimer, the term of this patent is extended or adjusted under 35 U.S.C. 154(b) by 458 days.

(21) Appl. No.: 15/822,288

(22) Filed: Nov. 27, 2017

(65) Prior Publication Data

US 2018/0149862 A1    May 31, 2018

Related U.S. Application Data

(60) Provisional application No. 62/426,655, filed on Nov. 28, 2016.

(51) Int. Cl.
  *G02B 27/00* (2006.01)
  *G02B 27/01* (2006.01)
  (Continued)

(52) U.S. Cl.
  CPC ....... *G02B 27/0081* (2013.01); *G02B 5/3058* (2013.01); *G02B 5/3083* (2013.01);
  (Continued)

(58) Field of Classification Search
  CPC ............ G02B 27/0081; G02B 27/0172; G02B 27/283; G02B 27/30; G02B 27/286;
  (Continued)

(56) References Cited

U.S. PATENT DOCUMENTS

| RE27,356 E | 5/1972 | LaRussa |
|---|---|---|
| 3,748,015 A | 7/1973 | Offner |

(Continued)

FOREIGN PATENT DOCUMENTS

| EP | 0825470 B1 | 2/1998 |
|---|---|---|
| GB | 2332533 | 6/1999 |

OTHER PUBLICATIONS

Freeman Mark—Schenk Harald et al: "MEMS Scanned Laser Head-Up Display" Moems and Miniaturized Systems X, Spie, 1000 20th St. Bellingham, WA 98225-6705 USA, vol. 7930, No. 1, Feb. 10, 2011 (Feb. 10, 2011), pp. 1-8 [retrieved on Feb. 14, 2011].

(Continued)

*Primary Examiner* — Stephone B Allen
*Assistant Examiner* — Adam W Booher
(74) *Attorney, Agent, or Firm* — Louis S. Horvath

(57) ABSTRACT

An optical apparatus has a laser source to direct modulated light toward a scan mirror and objective lens that define a focal surface. Pupil relay optics relay a first pupil at the scan mirror to a second pupil at an eye lens, the pupil relay optics defining an optical axis extending between pupils and having a curved mirror that transmits substantially half of the modulated beam and that has a first center of curvature at the first pupil and a first polarizer in the path of light from the scan mirror to reflect incident light of a first polarization and first angle toward the curved mirror surface and transmit incident light of an orthogonal polarization and second angle, wherein the pupil relay optics direct the modulated light beam twice to the first polarizer, and wherein the modulated light incident the second time is collimated and directed toward the second pupil.

16 Claims, 29 Drawing Sheets

(51) Int. Cl.
| | |
|---|---|
| *G02B 5/30* | (2006.01) |
| *G02B 26/10* | (2006.01) |
| *G02B 27/28* | (2006.01) |
| *G02B 27/30* | (2006.01) |
| *H04N 13/344* | (2018.01) |
| *H04N 9/31* | (2006.01) |

(52) U.S. Cl.
CPC ......... *G02B 26/10* (2013.01); *G02B 27/0172* (2013.01); *G02B 27/283* (2013.01); *G02B 27/30* (2013.01); *G02B 27/286* (2013.01); *G02B 2027/011* (2013.01); *G02B 2027/013* (2013.01); *G02B 2027/0178* (2013.01); *H04N 9/3111* (2013.01); *H04N 9/3132* (2013.01); *H04N 9/3161* (2013.01); *H04N 13/344* (2018.05)

(58) Field of Classification Search
CPC ............. G02B 27/01; G02B 27/0101; G02B 27/0149; G02B 27/017; G02B 27/0176; G02B 27/28; G02B 5/3058; G02B 5/3083; G02B 26/10; G02B 2027/011; G02B 2027/013; G02B 2027/0178; H04N 13/344; H04N 13/332; H04N 9/311; H04N 9/3132; H04N 9/3161; H04N 9/3129
See application file for complete search history.

(56) References Cited

U.S. PATENT DOCUMENTS

| | | |
|---|---|---|
| 6,072,632 A | 6/2000 | Ophey |
| 6,262,841 B1 | 7/2001 | Dike |
| 6,661,495 B1 | 12/2003 | Popovich |
| 8,274,720 B2 | 9/2012 | Kessler |
| 10,394,040 B2 | 8/2019 | Gollier et al. |
| 2003/0202253 A1 | 10/2003 | Coates et al. |
| 2007/0070508 A1 | 3/2007 | Ruhle et al. |
| 2011/0242635 A1 | 10/2011 | Oka |
| 2015/0338658 A1 | 11/2015 | Davis |
| 2015/0378074 A1 | 12/2015 | Kollin et al. |
| 2016/0341964 A1* | 11/2016 | Amitai ............... G02B 27/0081 |
| 2017/0351134 A1* | 12/2017 | Shimatani ........... G02B 27/0101 |

OTHER PUBLICATIONS

International Search Report & Written Opinion issued by the International Searching Authority in related international Patent Application PCT/US2017/063389 dated Mar. 8, 2018, 18 pgs.

International Preliminary Report on Patentability issued by the International Bureau in related International Patent Application PCT/US2017063389 dated Jun. 6, 2019, 12 pgs.

* cited by examiner

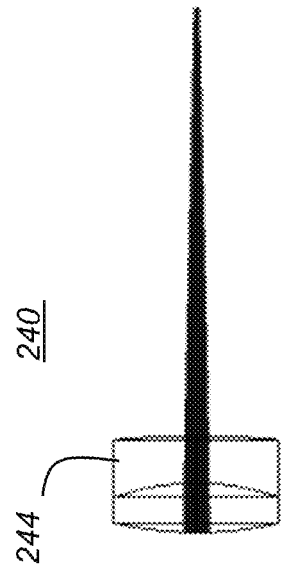
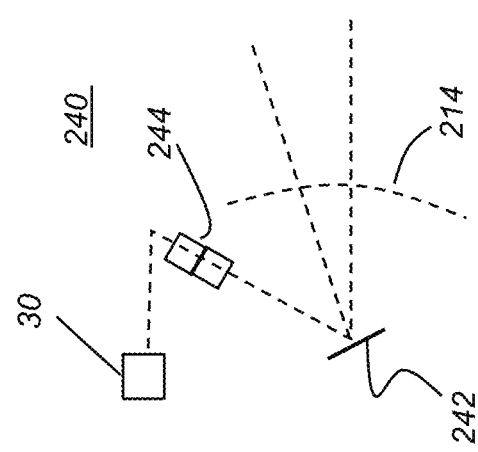
FIG. 3B
FIG. 3A

*Input optics*

| | | | | | | |
|---|---|---|---|---|---|---|
| 0 | OBJECT Standard ▸ | Infinity | Infinity | | 0.000 | 0.000 |
| 1 | STOP (aper) Standard ▸ | LAO-250-80 | 16.530 | 2.600 | N-SK11 | 4.000 U | 0.000 |
| 2 | (aper) Standard ▸ | -10.880 | 2.500 | N-SF5 | 4.000 U | 0.000 |
| 3 | (aper) Standard ▸ | -39.799 | 22.660 M | | 4.000 U | 0.000 |
| 4 | IMAGE Standard ▸ | Infinity | - | | 3.057E-04 | 0.000 |

FIG. 3C

SURFACE DATA SUMMA

| Surf | Type | Radius | Thicknes | Glass | Comment |
|---|---|---|---|---|---|
| OBJ | STANDARD | -10.75 | -10.75 | | curved object |
| STO | STANDARD | Infinity | 16.68128 | | scan mirror |
| 2 | STANDARD | -14.50911 | 0.5 | S-LAL14 | input surface |
| 3 | STANDARD | 24.26111 | 3.5 | S-LAL14 | 50/50 surface |
| 4 | STANDARD | Infinity | 0.15 | PMMA | QWP first path |
| 5 | STANDARD | Infinity | 0.01 | | gap |
| 6 | STANDARD | Infinity | -0.01 | MIRROR | moxtek |
| 7 | STANDARD | Infinity | -0.15 | PMMA | 2ns path in QWP |
| 8 | STANDARD | Infinity | -3.5 | S-LAL14 | plano of mangin |
| 9 | STANDARD | 24.26111 | 3.5 | MIRROR | main mirror |
| 10 | STANDARD | Infinity | 0.15 | PMMA | thurd qwp path |
| 11 | STANDARD | Infinity | 0.01 | | 3rd gap path |
| 12 | STANDARD | Infinity | 0.7 | BK7 | moxtek substrate |
| 13 | STANDARD | Infinity | 0.5 | S-LAL14 | |
| 14 | STANDARD | 19.7899 | 20 | | output surface |
| 15 | PARAXIAL | - | 21 | | iris |
| IMA | STANDARD | Infinity | | | retina |

*FIG. 4B*

WEARABLE DISPLAY FOR NEAR-TO-EYE VIEWING

CROSS REFERENCE TO RELATED APPLICATIONS

This application claims the benefit of U.S. Provisional application Ser. No. 62/426,655, provisionally filed on Nov. 28, 2016 entitled "WEARABLE DISPLAY FOR NEAR-TO-EYE VIEWING" in the names of David Kessler et al., incorporated herein in its entirety.

TECHNICAL FIELD

The present invention relates generally to near-to-eye displays and more particularly to a display that employs an imaging apparatus that employs a pupil relay configuration having concentric design.

BACKGROUND

There have been a number of solutions proposed for providing image content from wearable devices. Various types of goggles, glasses, and other apparatus have been described for displaying image content to a viewer who is wearing the apparatus. These devices may be completely immersive, so that the viewer sees only images generated by the apparatus and has no ability to see the outside world when wearing the device, thus providing virtual reality (VR) display. Alternately, varying degrees of visibility of the real world are provided with other designs, so that the generated images are superimposed on the real-world image as an augmented reality (AR) or mixed reality display or, in some way, used to complement the real-world visual content that lies in the viewer's field of view.

Wearable display devices offer considerable promise for providing information and displaying complementary imagery that can improve performance and efficiency in a number of fields and can help to enhance a viewer's understanding of visual content that lies in the field of view. In medicine and dentistry, for example, the capability to view image content that had been previously stored and, optionally, post processed, or is currently being acquired from another vantage point can help the practitioner to more accurately obtain detailed data that would aid diagnosis and treatment. Imaging data that is currently available only from high-cost 3-D imaging systems can be provided in a usable format for viewing on less expensive wearable imaging equipment that allows the practitioner to have this information in an active clinical setting. Stereoscopic imaging, with its enhanced spatial understanding and improved presentation of relevant detail, can be particularly useful for those treating patients using medical imaging guidance or medical data, as well as for those skilled in other fields. In addition, even the presentation of non-stereoscopic 2-D image content, provided by eyewear that allows clear visibility of the primary visual field without obstruction, can be useful for various functions, including uses in patient monitoring as well as tele-medicine and in remote diagnostic or therapeutic guidance, for example.

With many of the apparatus that have been proposed for wearable displays, the viewer is encumbered by the device in some way, due to device size, bulkiness and discomfort, component and image positioning, poor image quality, eye fatigue, and other difficulties. Although many clever solutions for providing a more natural viewing experience have been outlined, and a number of advances toward improved image quality have been introduced, the form factors for many of these solutions still make it difficult to win broad-based acceptance for these devices, particularly for long-term use or during work or recreational activity. Their bulky size and appearance are still considered to be significant factors in limiting the appeal of wearable imaging devices for many people.

Despite years of design effort and optimization, including integration of miniaturization and improved imaging technologies, designing wearable display apparatus with acceptable ergonomics and high image quality has proved to be a continuing challenge. Workable solutions for wearable display devices that have a natural "feel" and that can be easily worn and used remain elusive. Thus, it can be appreciated that there is a need for a wearable device for single-eye or stereoscopic display that provides high image quality and is lightweight, is inexpensive, easy to use, and ergonomically less invasive and cumbersome than conventional designs and provides enhanced display opportunities without obstructing or diminishing the primary visual field.

SUMMARY

It is an object of the present invention to advance the art of direct, virtual retinal display, more generally known as virtual image presentation for virtual or augmented reality viewing from a wearable apparatus. Embodiments of the present disclosure provide a wearable viewing apparatus that provides suitable image quality with little or no impediment to viewer visibility over the field of view. Embodiments of the present disclosure can provide an improved viewing apparatus that reduces a number of optical, physiological, and ergonomic constraints of conventional head-mounted displays (HMDs). Embodiments of the present disclosure can provide a wearable viewing apparatus having increased field of view with versatile arrangements of scanning, beam width adjustment, and related optical components in an ultra-near-to-eye imaging arrangement, including embodiments with optical components within the object focal length of the eye.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the present disclosure, there is provided an optical apparatus for near-eye viewing comprising:
 a laser light source energizable to direct a beam to a scan mirror;
 a curved mirror surface optically concentric with the scan mirror and partially transmissive;
 a first polarizer disposed between the scan mirror and the curved mirror surface, the first polarizer having a first polarization axis;
 a quarter wave plate disposed between the polarizer and the curved mirror surface;
 a second polarizer disposed downstream from the curved mirror and having a second polarization axis that is orthogonal to the first polarization axis.

According to an alternate aspect of the present disclosure, there is provided an optical apparatus worn by a viewer and comprising:
 a laser light source energizable to direct a modulated beam toward a scan mirror;

an objective lens in the path of the modulated beam directed toward the scan mirror, wherein the objective lens and the scan mirror define a curved focal surface for the modulated beam;

pupil relay optics disposed to relay a first pupil at the scan mirror to a second pupil at an eye lens of the viewer, the pupil relay optics defining an optical path that extends along an optical axis between the first and second pupils, the optical path comprising:

(i) a curved mirror surface disposed to transmit substantially half of the light incident from the modulated beam and that has a first center of curvature at the first pupil; and (ii) a first polarizer disposed in the optical path to receive light from the scan mirror and formed to reflect incident light of a first polarization toward the curved mirror surface and to transmit incident light of a second polarization, orthogonal to the first polarization, wherein the optical path defined by the pupil relay optics directs the modulated light beam twice to the first polarizer, and wherein the modulated light beam incident the second time on the first polarizer is collimated and directed toward the second pupil.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 3A and 3B are schematic views showing input optics for scanning and prefocusing according to an embodiment of the present disclosure.

FIG. 3C lists surface and lens characteristics for the input optics.

FIG. 4B lists surface and lens characteristics for the refractive configuration of FIG. 4A.

DETAILED DESCRIPTION

Figure 1A:
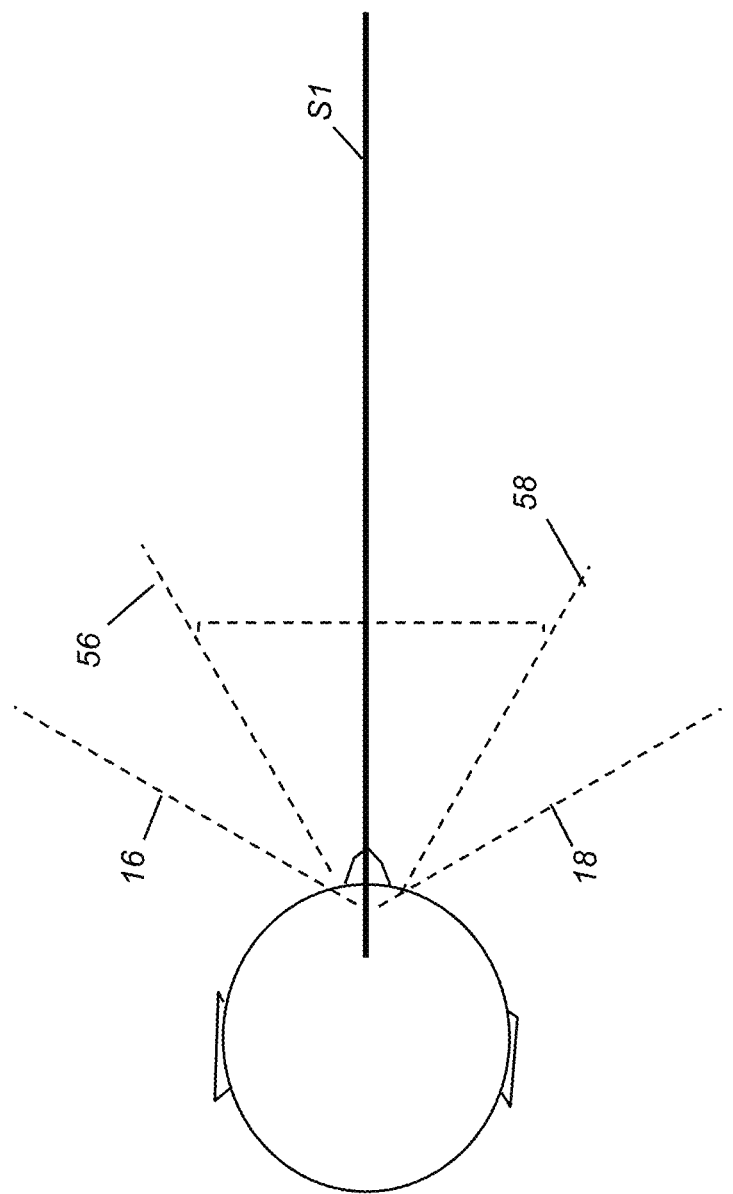
FIG. 1A is a schematic top view that shows the horizontal field of view of a viewer.

Figures provided herein are given in order to illustrate principles of operation and component relationships along their respective optical paths according to the present invention and are not drawn with intent to show actual size or scale. Some exaggeration may be necessary in order to emphasize basic structural relationships or principles of operation. Some conventional components that would be needed for implementation of the described embodiments, such as support components used for providing power, for packaging, and for mounting, for example, are not shown in the drawings in order to simplify description of the invention. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and do not describe any necessary orientation of the assembly in an optical apparatus. The terms "upstream" and "downstream" as used herein have their conventional usage and refer to relative positions of light or light-conditioning or redirecting components as the light proceeds along an optical path.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

In the context of the present disclosure, the term "left eye image" describes a virtual image that is formed in the left eye of the viewer and a "right eye image" describes a corresponding virtual image that is formed in the right eye of the viewer. The phrases "left eye" and "right eye" may be used as adjectives to distinguish imaging components for forming each image of a stereoscopic image pair, as the concept is widely understood by those skilled in the stereoscopic imaging arts.

An optical pupil relay system defines an optical axis and an optical path that transfers a beam incident at a first pupil at a first position to a second pupil position. That is, the scanned beams coming out of the aperture at the first position are all directed to overlap at the second position, with possible magnification. In embodiments of the present disclosure, no pupil magnification is required; pupil relay optics described herein can be 1:1 relays. Additional magnification can be provided, however. The beam angles are not identical at the respective first and second pupil positions; at the input pupil to the relay system, beams are divergent and at the output pupil, beams are collimated. In a pupil relay system, the input and output pupils are clearly defined by the optical components.

It is well known that optical systems have two sets of conjugate surfaces. A first set of conjugate surfaces comprises the object and image surfaces of the optical system; a second set of conjugate surfaces comprises the entrance pupil and the exit pupil. By default, when imaging is discussed, it is understood that the conjugate surfaces are the object and the image surface. The term "pupil relay", as used in the optical arts and in the instant disclosure, is used to emphasize that the main function of the optical system is to image the entrance pupil to the exit pupil. Imaging can be achieved using pupil relay optics; however, the principles of operation are based on relay of a first pupil to a second pupil, as is familiar to those skilled in the optical design arts.

The requirements for aberration correction for an optical system differ, depending on whether the system is an object-to-image imager or a pupil relay. Since an imaging system is commonly used with incoherent light, phase differences between object points is of little or no interest. In a pupil relay, however, the phase at the entrance pupil is a consideration. Typically, a pupil relay accepts a collimated beam centered at the entrance pupil at some field angle, and provides an output beam, usually collimated and centered at the exit pupil, and with no degradation of the phase of the input beam.

Two sets of aberrations may need to be corrected, corresponding to the two sets of conjugates, as is well known to those skilled in optical design. Among those skilled in optics, the set of aberrations associated with the conjugation of the entrance pupil to the exit pupil are termed "pupil aberrations". For example, a well known imaging system is the "Offner system" disclosed in U.S. Pat. No. 3,748,015 to Offner entitled "Unit Power Imaging Catoptric Anastigmat". The Offner system is designed to be corrected over an arc at the image plane. It is not corrected, however, as a relay, and an incoming collimated beam, even if on axis, will be strongly degraded. U.S. Pat. No. 8,274,720 by Kessler, entitled "Concentric Afocal Beam Relay," discusses the steps and significant modifications needed for conversion of the Offner imager to an afocal pupil relay.

It is noteworthy that most pupil relays are afocal. That is, for pupil relays, both the input beam and the output beam are collimated. The system typically has no power but is usually composed of two groups, both with optical power, wherein each of the groups of optics is focal. The combination of the two groups results in an afocal relay in the same way that an afocal Keplerian telescope is composed of two positive groups with an intermediate focal plane, where the two groups are significantly separated by their two focal distances.

Pupil relays for embodiments of the present disclosure are focal. A focal pupil relay defines an optical path that accepts a focused input beam and outputs a collimated beam. In general, the focal pupil relay includes multiple lens elements and related optical components that can be formed into a small number of groups, with grouped elements cemented together or clustered together in close proximity. This characteristic makes the focal pupil relay compact, when compared to afocal relays that use separated groups, such as mirrors. An example of an afocal relay is given in US Patent Application Publication No. 2011/0242635 by Oka. It should be noted that the optical path tracks the optical axis, but is not necessarily collinear with the optical axis at each point. The optical axis can be a single, undeviated line that connects the two pupils or may be folded and have a number of line segments having different directions, such as using mirrors or reflective polarizer optics, as described in subsequent embodiments.

A characteristic of the pupil relay, as compared with imaging optics in general, is that the input and output pupils are clearly defined by the optical system geometry. The focal pupil relay optics of the present disclosure performs two functions of particular significance to the imaging task: (i) conjugates the entrance pupil, at which a scanner mirror is positioned, with the exit pupil, at the position of the iris of the viewer's eye; and (ii) collimates the curved input focal surface.

By comparison with the focal pupil relay, an afocal relay provides only the first function (i), conjugation of entrance and exit pupils. Collimation is not provided with the afocal relay, since the input beam is already collimated and the relay system has no optical power.

The term "oblique", where used in the present disclosure, describes an angular relationship that is not parallel or normal, that is, other than an integer multiple of 90 degrees. In practice, two optical surfaces are considered to be oblique with respect to each other if they are offset from parallel or normal by at least about +/−2 degrees or more. Similarly, a line and a plane are considered to be oblique to each other if they are offset from parallel or normal by at least about +/−2 degrees or more. Substantially parallel planes are parallel to within +/−2 degrees. Likewise, substantially parallel beams are parallel to within about +/−2 degrees.

In the context of the present disclosure, the term "about", when used with reference to a measurement, means within expected tolerances for measurement error and inaccuracy that are accepted in practice. Some reasonable tolerance must be allowed, for example, for measurement differences in determining the extent of a particular viewer's visual field, as it would vary from the measurement of one practitioner to another.

Microelectromechanical systems (MEMS) devices include a number of mechanical components that provide systems of miniaturized mechanical and electromechanical elements (that is, devices and structures) that are made using microfabrication techniques analogous to those used for forming semiconductor devices. MEMS devices can vary from relatively simple structures having no moving elements, to extremely complex electromechanical systems with multiple moving elements under the control of integrated microelectronics. In a MEMS device, at least some of the elements have a mechanical function, whether or not the elements are themselves movable. MEMS devices can alternately be termed "micro-machined devices" or devices formed and operating using microsystems technologies. Physical dimensions of individual MEMS elements can range from well below one micron to several millimeters. In the context of the present disclosure, MEMS devices provide mechanically movable elements, such as reflectors, that are energizable to temporally and spatially modulate light in order to provide a virtual image using a raster scan pattern.

In contrast to methods for forming a real image, a virtual image is not formed on a display surface. That is, if a display surface were positioned at the perceived location of a virtual image, no image would be formed on that surface. A virtual image is formed by an optical system that also determines viewing parameters such as far point, apparent angular width, and other characteristics. Virtual image display has a number of inherent advantages for augmented reality and virtual reality viewing. For example, the size of a virtual image is not limited by the size or location of a display surface. Additionally, the source object for a virtual image may be small; a magnifying glass, as a simple example, provides a virtual image of its object. It is known that, in comparison with systems that project a real image, a more realistic viewing experience can be provided by forming a virtual image that is disposed to appear some distance away. Providing a virtual image using only modulated light also obviates any need to compensate for screen or other display artifacts, as may be necessary when forming a real image.

In conventional use, the term "field of view" (FOV) broadly relates to the overall visual field that is available to a viewer with relatively normal eyesight under daylight viewing conditions. Field of view is typically measured in orthogonal horizontal and vertical directions. FIG. 1A shows how angular portions of the horizontal field of view are defined according to the present disclosure. Horizontal monocular visual limits are generally considered to be slightly in excess of 120 degrees, centered about a central horizontal line of sight S1, as bounded between lines 16 and 18. Symbol recognition in the horizontal FOV is generally considered to be in the area about +/−30 degrees from horizontal line of sight S1, as bounded between lines 56 and 58.

Figure 1B:
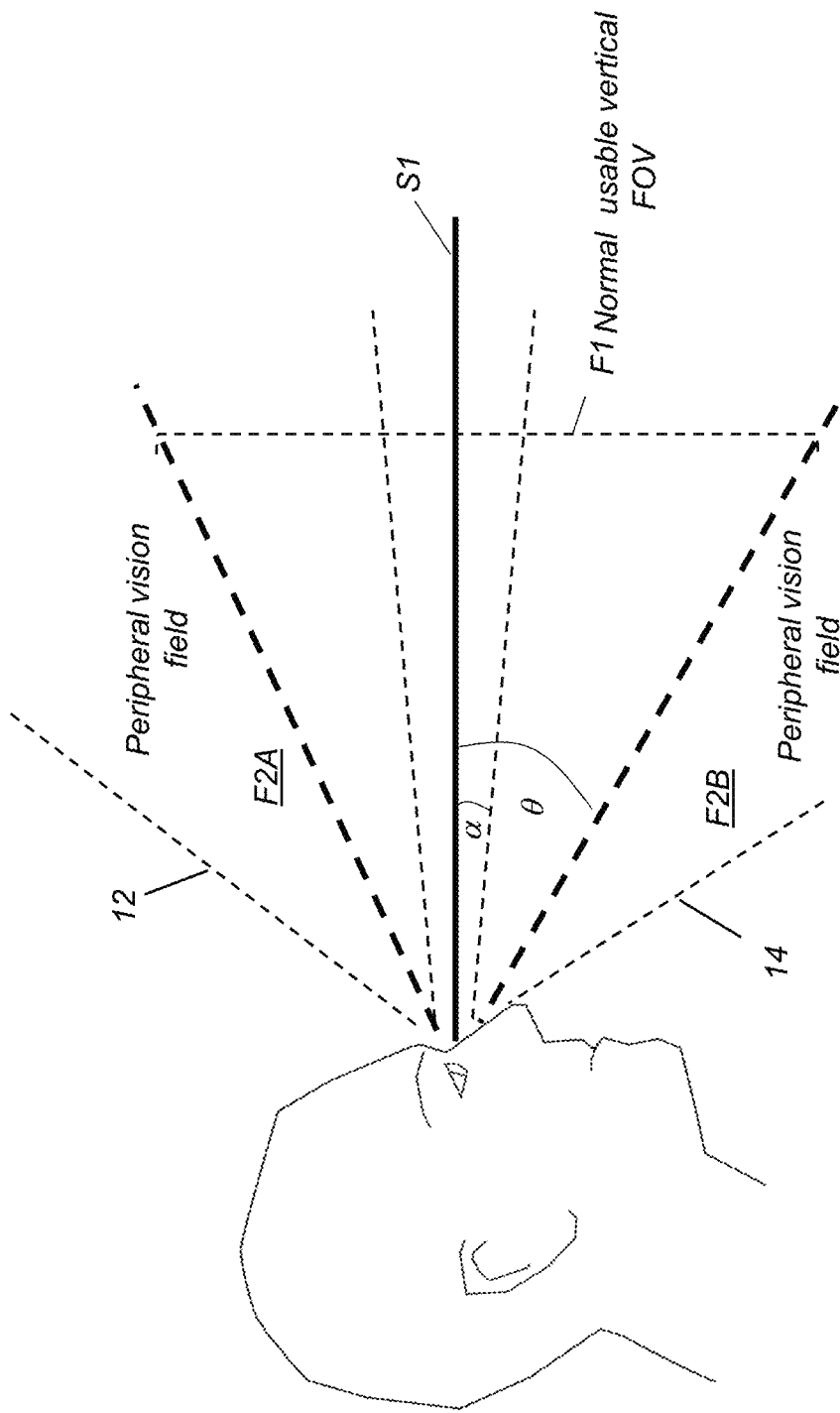
FIG. 1B is a schematic side view that shows the vertical field of view of a standing viewer looking forward, with normal and peripheral fields of view.

The vertical field of view, as this measurement is referred to herein, is shown schematically in FIG. 1B. A horizontal line of sight S1 is defined, extending generally at about 0 degrees to horizontal for a viewer who is standing, varying from true horizontal by no more than about +/−2 degrees. The horizontal line of sight has been defined as the primary position of the eyes with the retinal plane co-planar with the transverse visual head plane. This plane is defined by the principal retinal plane of the eye, the oculomolar nucleus and the calcimine cortex. It is defined as having a constant relationship to the canthomeafal line and perpendicular to Listing's plane. The full vertical FOV for an adult viewer having normal vision generally extends from about 60 degrees above (expressed as +60 degrees) to about 75 degrees below horizontal (expressed as −75 degrees); the normal "usable" vertical field of view (FOV) F1 for display of a virtual image is typically considered to be defined within the range of angles from +25 degrees above to −30 degrees below the horizontal line of sight S1.

Different portions of the field of view can be distinguished from each other. Foveal vision, having the highest visual acuity due to the greatest retinal cone density, encompasses the central portion of the human visual field. This region uses approximately 50% of our optical pathway. Parafoveal vision, providing high quality acuity and color vision as well, due to a high retinal cone concentration, is thus generally considered to be at an angle α that is within no more than about +/−5 degrees of the line of sight. The approximately ten-degree parafoveal visual field is generally circular about the line of sight with about a four-inch diameter at a distance of 22 inches. As an approximation for an adult viewer, this region would be slightly smaller than the surface of a standard compact disc (CD) or digital video disc (DVD) held out at arm's length. Outside of this region, the visual field is considered to be peripheral and provides increasingly less visual information. Due to the retinal rod distribution of the human eye, the bulk of peripheral visual information lies within about the first 20 degrees beyond the parafoveal field of view.

Figure 1C:
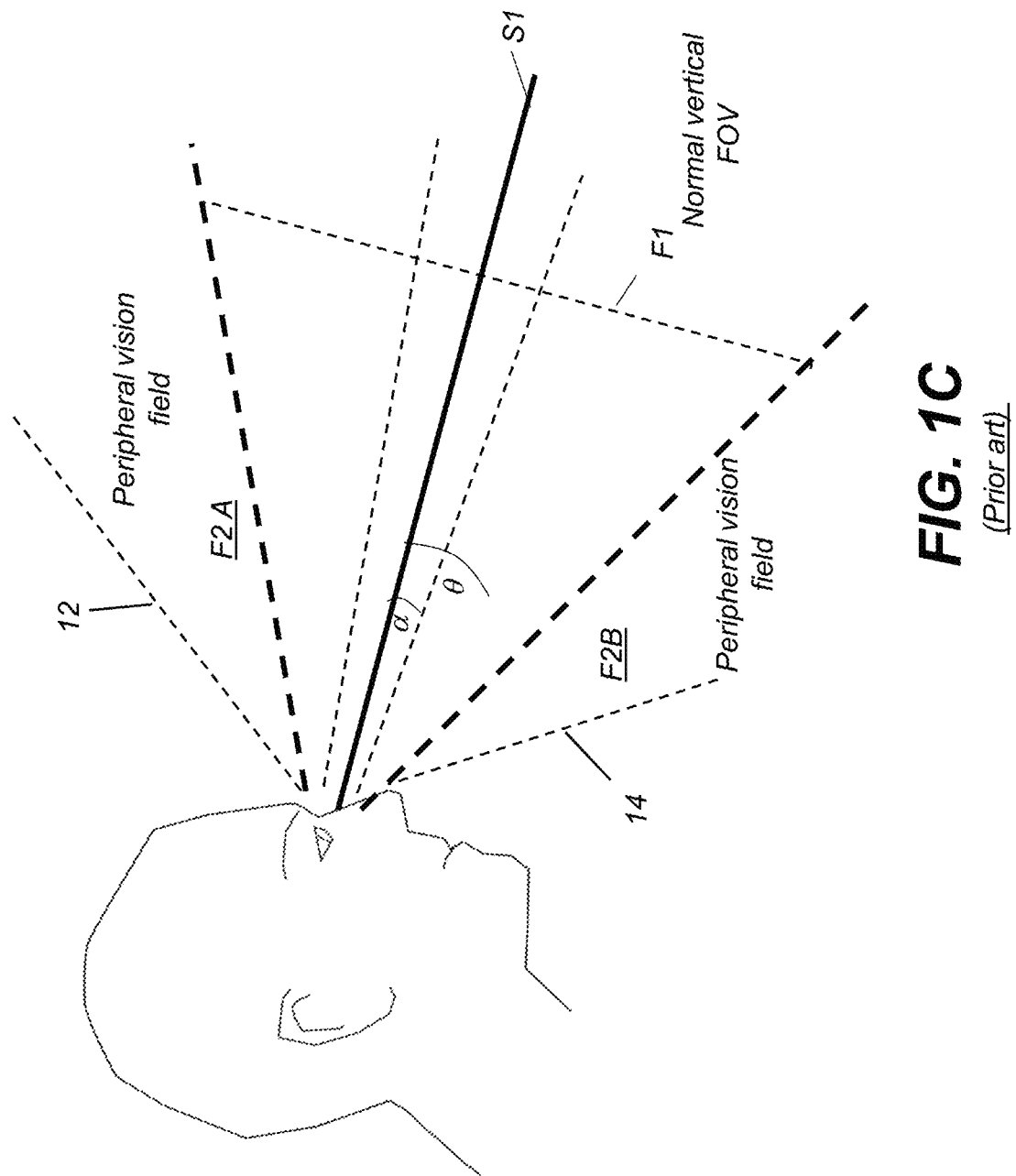
FIG. 1C is a schematic side view that shows the vertical field of view of a seated viewer looking forward, with normal and peripheral fields of view.

For the embodiments described herein, a normal usable vertical FOV F1 is larger than the parafoveal FOV and is defined as being within the range from about +25 to −30 degrees of the line of sight. FOV F1 is considered generally to be within the limits of color discrimination, which degrades substantially for vision angles increasingly outside this region. FIGS. 1B and 1C show the lower portion of the normal vertical FOV F1, below forward horizontal line of sight S1, as bound within an angle θ of horizontal line of sight S1. The region that lies within the +60 to −75 degree vertical visual limits of the viewer but in the regions above or below the normal vertical FOV F1 is considered to be the "vertical peripheral vision" field or, simply, a peripheral vertical field with upper and lower portions F2A, F2B, respectively.

FIG. 1B shows the two portions of the peripheral vertical field, an upper portion F2A above the line of sight S1 and a corresponding lower portion F2B below horizontal line of sight S1. Upper portion F2A lies between about 60 degrees from line of sight S1, shown by a line 12, and the upper definition of FOV F1 which is about 25-30 degrees above line of sight S1. A lower portion F2B of the peripheral vertical field lies below FOV F1 which extends down to about −30 degrees; portion F2B is bounded by about −75 degrees from line of sight S1, shown by a line 14. Thus, lower portion F2B of the peripheral vertical FOV lies between about −30 and −75 degrees relative to horizontal light of sight S1.

Line of sight S1 generally tracks head position. For a seated viewer, for example, the reference line of sight S1 tends to shift downwards to about 15 degrees from horizontal. All of the other vertical coordinates and angles that define parafoveal and peripheral fields shift accordingly, as is shown schematically in FIG. 1C. In the context of the present disclosure, the reference line of sight S1 for vertical fields is considered to correspond to the horizontal for a standing viewer, tilted to about 15 degrees from horizontal for a seated viewer. This line of sight is termed a horizontal line of sight in the description that follows.

Figure 1D:
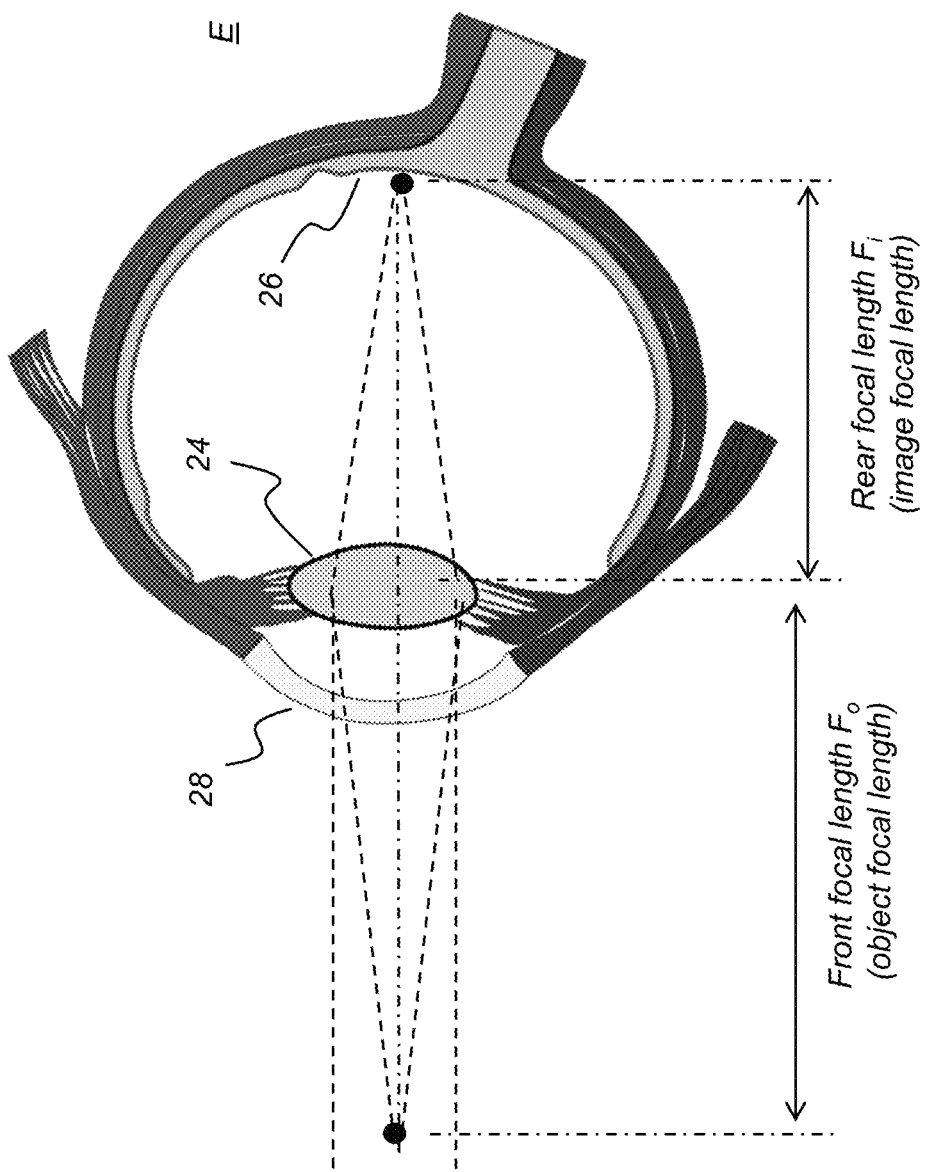
FIG. 1D is a cross section view showing portions of the eye and object and image focal lengths of the eye.

As shown in the cross-sectional side view of FIG. 1D, the optics system of the human eye E, considered as an optical component primarily with lens 24 and cornea 28, has focal lengths that are determined by the geometry of the lens 24, cornea 28, and the surrounding medium. For an adult with normal, uncorrected vision, the eye E has a front focal length $F_o$ of about 16.7 mm. The normal, uncorrected adult human eye E has a rear focal length $F_i$ of about 22.3 mm. The front focal length $F_o$ is in air; the rear focal length $F_i$ is within the refractive liquid medium of the eye E, which effectively shortens the actual optical distance dimensions as shown in FIG. 1D. The iris, which forms the pupil of the eye as an imaging system and limits the aperture to less than about 7 mm, is not shown for clarity in FIG. 1D. Under bright light conditions, the pupil diameter controlled by the iris averages only about 2.5 mm. A "normal" eye can focus parallel light rays from a distant object onto the retina 26, with the parallel rays considered to be at infinity, to a point on the retina 26 at the back of the eye E, where processing of the visual information begins. As an object is brought close to the eye E, however, the muscles change the shape of the lens 24 so that rays form an inverted real image on the retina 26. The theoretical region of focus in front of the lens is the object image zone.

Figure 1E:
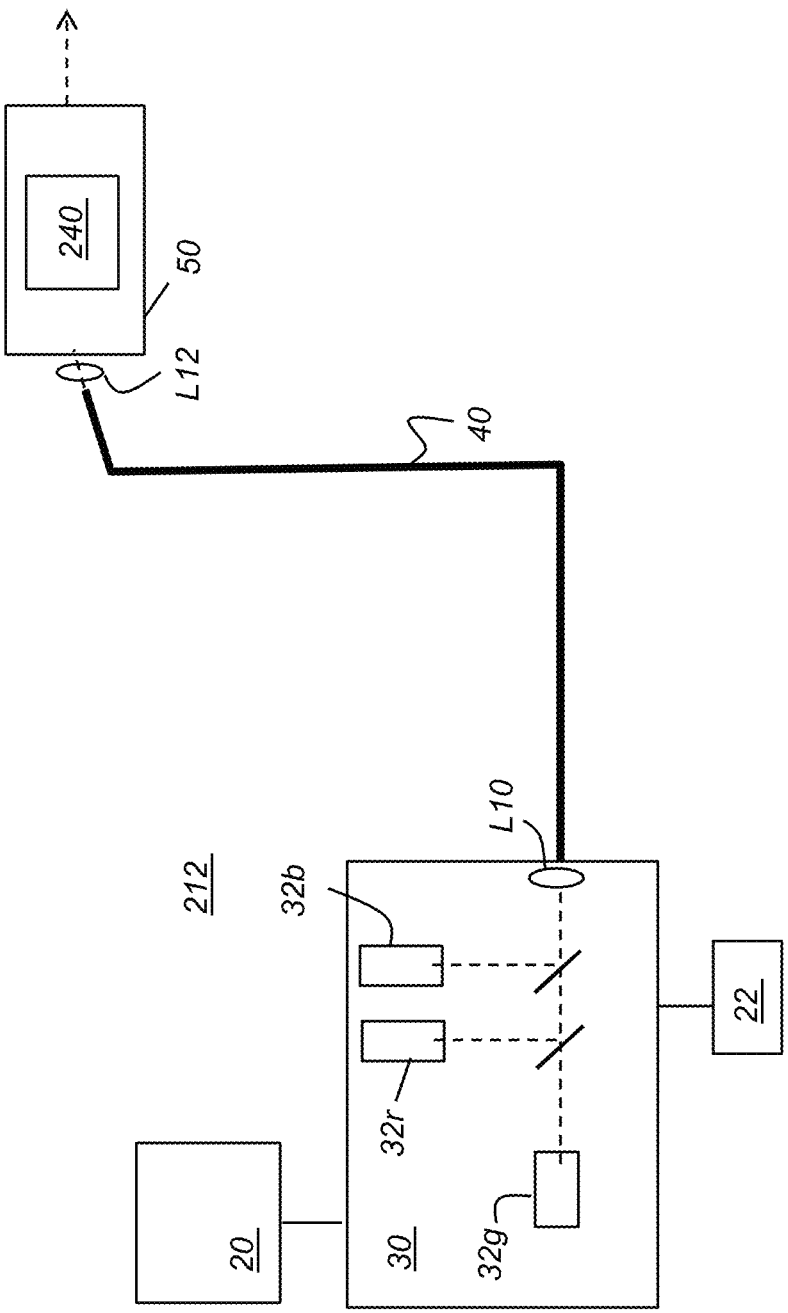
FIG. 1E is a schematic diagram that shows components of an image source according to an embodiment of the present disclosure.

The schematic block diagram of FIG. 1E shows components of an image generator 212 for forming a modulated beam according to an embodiment of the present disclosure. A control logic processor 20 obtains image data, either from a memory or from some other image source, such as via wireless transmission (e.g. Bluetooth), and provides the necessary timing and control signals for forming the image in each eye of the viewer. Control logic processor 20 is in signal communication with a light module 30 and modulates the light from module 30 in order to provide color image content. Frequency, duration, intensity and color modulation is provided. According to an embodiment, light module 30 provides modulated light from red, green, and blue laser diodes 32r, 32g, and 32b, respectively, coupled along an optical path and through an optional objective lens L10 to a light guide, such as an optical fiber 40. The modulated beam is characterized by pulses of laser light of variable color, duration and intensity. This light must be raster-scanned in order to form a recognizable image. Optical fiber 40 directs the source light to a MEMS scanner apparatus 50, such as through an optional collimator lens L12. The optional collimator lens L12 can alter focus in addition to beam size. Optional beam expanders can alternately be used. When energized, the MEMS scanner apparatus 50 scans by reflecting the light from optical fiber 40 through input lens 240, described in more detail subsequently, in a raster scanning pattern. Power is provided by a power source 22, such as a battery.

In embodiments that provide stereoscopic imaging, an optical fiber 40 and scanner apparatus 50 can be provided for each eye E. (Only the system for a single eye E is shown in FIG. 1E for clarity.) The same light module 30 can be used to generate images for both eyes, such as synchronously generating left- and right-eye modulated light; alternately, each eye E can have a separate light module 30, with appropriate image processing logic, provided by control logic processor 20 and appropriate light handling components for the optical path that forms each left-eye and right-eye image.

Light module 30 can be a commercially available modular component for generating a modulated beam of light according to input image data, such as a pico-projector device from Microvision, Inc., Redmond, Wash. for example. By way of example only, this device forms an image using light from three primary color laser diodes, at 638 nm (Red), 517 nm (Green), and 450 nm (Blue). Other wavelengths can be used for primary colors. The lasers can be low-power Class 1 devices, whose light can be directed toward the eye of a viewer without concern for energy levels that are considered to be harmful. Light from each of the primary color lasers can be provided separately, so that red, green, and blue beams are provided in rapid sequence. Alternately beams of the different primary wavelengths are combined for forming the color image. Techniques for beam combination include the use of dichroic combiners, for example. Spot sizes for the light beams can be varied from each other, such as for improved efficiency. The light beams can be collimated to provide the smallest optimal size or enlarged to overfill a small or large MEMS scanning mirror, as described in more detail subsequently. Beams can be converted from a generally Gaussian profile to a flat-top profile for improved beam homogeneity.

An exemplary optical fiber 40 can be a single-mode optical fiber. This type of light guide can be easily fitted into the band that is used for fitting the scanner apparatus 50 against the viewer's face, as described subsequently. The optical fiber can have an angled or otherwise shaped termination, such as to help prevent back reflection. A single fiber can be used for guiding light from all of the laser diodes 32r, 32g, 32b. Alternately, three fibers can be used, spliced together to form a single fiber at the light output at scanner apparatus 50.

The optical components of scanner apparatus 50 used in a particular wearable imaging apparatus can vary and may include, in addition to a MEMS scanner device, alternate types of reflective and refractive relay optics, folding optics that may or may not provide optical power, and other components that are used to scan image content into eye E. Alternate components that may be part of scanner apparatus 50 are described with reference to subsequent embodiments of the present disclosure.

Figure 1F:
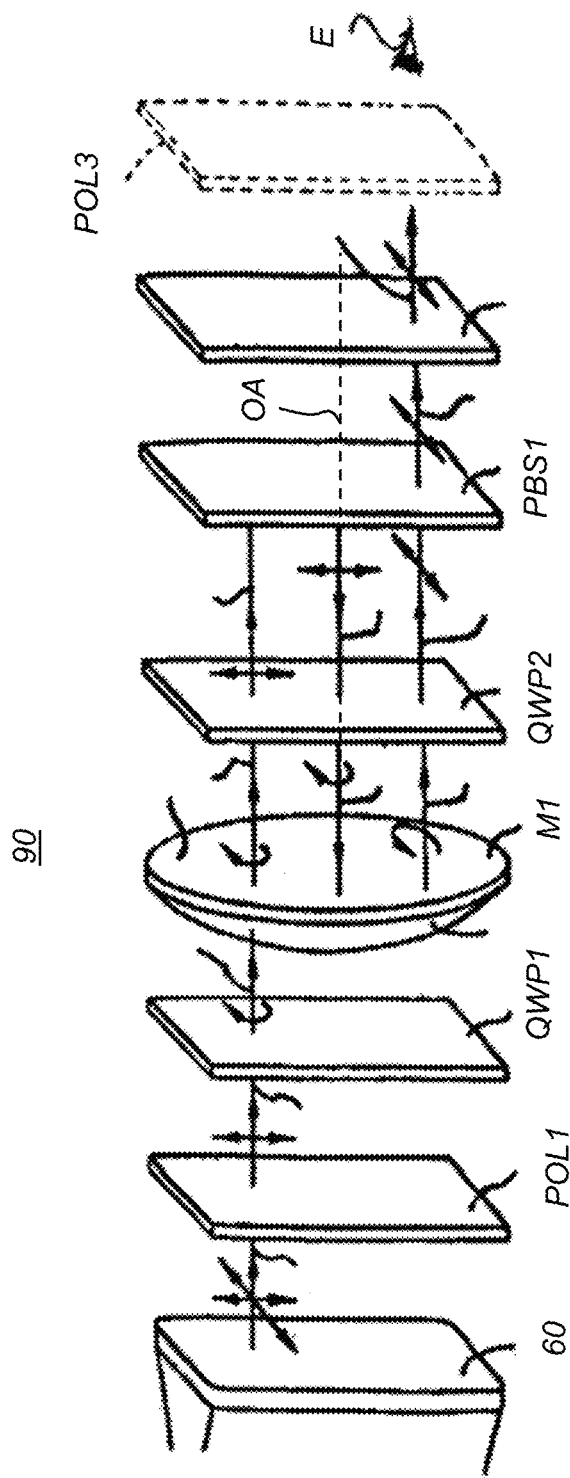
FIG. 1F is a schematic diagram showing a conventional "pancake" design for an eyepiece of an imaging apparatus.

The schematic diagram of FIG. 1F shows an exploded view of a conventional "pancake" optical system 90 of an eyepiece intended for forming an image for a viewer. The optical system uses polarization for folding the light path of the modulated beam back upon itself and employs reflective focusing optics with a curved mirror M1. Curved mirror M1 defines an optical axis OA. The conventional image source 60 is a cathode-ray tube or other emissive surface that provides a two-dimensional (2-D) image field. Image source 60 is positioned at the front focal surface of a curved mirror M1. A collimated beam is provided to the eye E from every field point. For the conventional pancake optics design, magnification is very large and can be considered to be effectively infinity.

The pancake system 90 works as follows: unpolarized light of a modulated beam from the CRT or other image source 60 is linearly polarized by polarizer POL1 and converted to a left-hand circularly polarized light by quarter wave plate QWP1. The light goes through semi-transparent curved mirror M1; half of the light is reflected and lost. Mirror M1 is considered to be "partially transmissive" or "semi-transmissive" or "semi-transparent", so that it transmits at least about 35% of the incident light from QWP1, preferably transmitting 50% of the incident light and reflecting 50% for peak efficiency. A partially transmissive or semi-transparent curved mirror does not transmit more than 65% of the incident light.

The transmitted circularly polarized light goes through another QWP2 to become vertically linearly polarized light and is directed to a reflective polarizer, polarization beam splitter PBS1, which reflects most of the light back towards the curved mirror M1. Reflected light from PBS1 transits QWP2 again to become right-hand circularly polarized. The curved mirror M1 again reflects about half of the light and loses the other half from transmission. The reflected polarized light from mirror M1 is now left-hand circularly polarized and is converted by quarter wave plate QWP2 into horizontally polarized light, passing through the reflective polarizer or polarization beam splitter PBS1 and through an optional cleaning polarizer POL3 into the eye E of the viewer. Each transit of the light through a quarter wave plate (QWP) retards the phase by a 45 degree shift, changing polarization state.

In spite of seemingly complex polarization and light-directing mechanisms, pancake optics function well, but with the penalty of considerable loss of more than 75% of the light originally generated from the light source 60. This inefficiency and substantial loss of light makes the pancake optical configuration unusable for many applications with conventional sources of modulated light. The Applicants, however, have recognized that this optical configuration can be useful given the high levels of light attenuation using lasers with MEMs modulation, in which it is desirable to limit the light energy provided to the viewer eye box.

Advantageously, this configuration uses the mirror on axis, without the need to provide other means for separating the input beams into the mirror from the output beams and without the requirement for folding one or another portion of the optical path for image-forming. Conventional techniques employ a beam splitter for light path redirection between the eye and the mirror as is done, for example, in the Google-Glass™ system by Google, Inc. or by tilting the curved mirror, thereby introducing large off axis aberrations.

Thus, the pancake design has the advantage of higher resolution over a larger field of view (FOV) as compared to a tilted mirror system. The pancake optical design is smaller, with better eye relief as compared to single mirror system using a splitter.

Embodiment #1

Figure 2A:
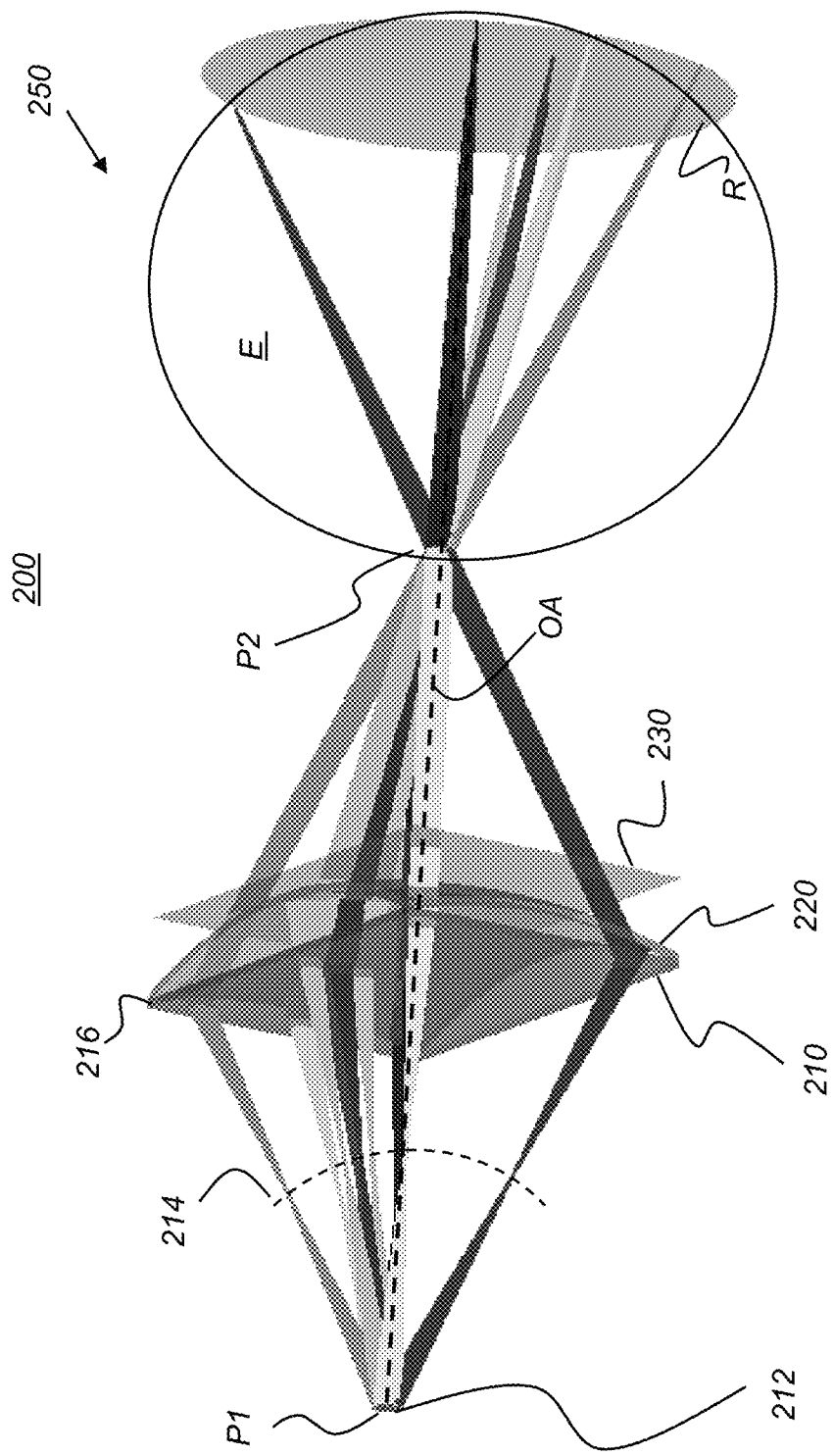
FIG. 2A is a perspective view that shows components of a pupil relay in an imaging apparatus for near-eye viewing according to an embodiment of the present disclosure.
Figure 2B:
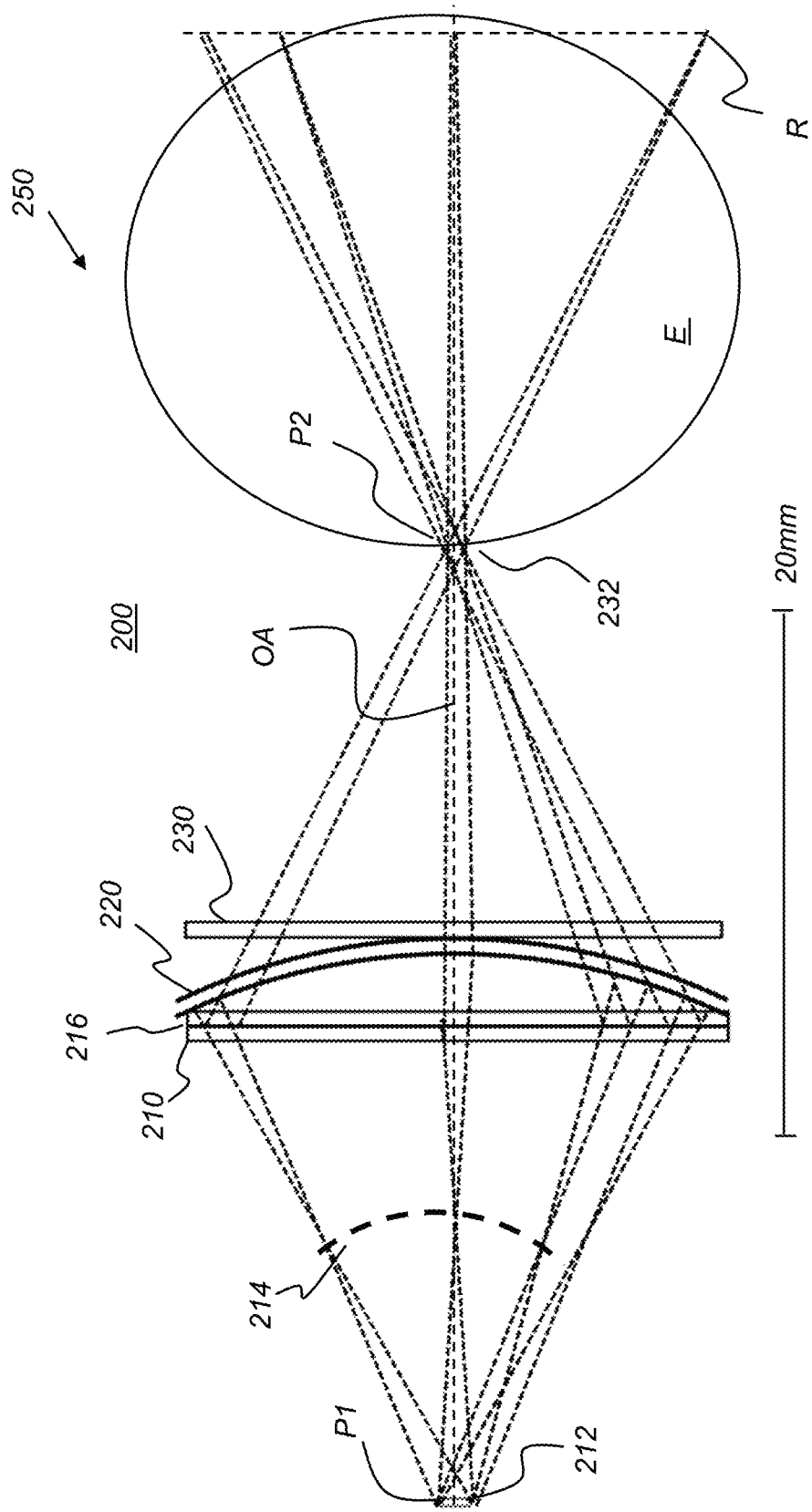
FIG. 2B is a side view that shows components of an imaging apparatus for near-eye viewing according to a pupil relay embodiment of the present disclosure.

The perspective view of FIG. 2A and side view of FIG. 2B show components of an imaging apparatus 200 for near-eye viewing using a 1:1 pupil relay apparatus 250 arrangement according to an embodiment of the present disclosure. This embodiment employs an optical "pancake" configuration as an optical relay system, using reflective components for beam shaping and focus that defines an optical axis and relays the input pupil to the output pupil. With the arrangement shown in FIGS. 2A and 2B, imaging apparatus 200 relays an input pupil P1 at image generator 212 to an output pupil P2 at the eye E of the viewer. Alternately stated, imaging apparatus 200 conveys a curved image at a focal surface 214 (wherein the generated image at focal surface 214 occupies the "object" position relative to the optics) to an image field at retina R. That is, in addition to its role as pupil relay optics, apparatus 200 also images, to retina R, a curved aerial "object", the real image formed at focal surface 214, that is generated by the focused, scanned modulated beam from image generator 212.

An image generator 212 is provided by a scan mirror at an entrance pupil P1 that directs a focused modulated beam of light to form curved aerial image at focal surface 214 as the "object" for subsequent imaging by imaging apparatus 200. The modulated light at the aerial image is linearly polarized and is directed to a polarizer 210 that transmits light of a first polarization and reflects light of a second polarization that is orthogonal to the first polarization. The transmitted modulated light is directed through a quarter wave plate 216 which provides the corresponding phase retardance and to a curved mirror 220 that is partially reflective (nominally 50% reflective), partially transmissive (nominally 50% transmissive) and that serves as a type of beam splitter, focusing the modulated beam of light. Reflection of a portion of the light from mirror 220 reverses the circular polarization of the light, which transmits through the quarter wave plate 216 when traveling in the opposite direction. Light transmitted through mirror 220 polarizes, absorbed by circular polarizer 230. Light reflected from mirror 220 has changed circular polarization and is reflected from polarizer 210 and back through quarter wave plate 216. A portion of this light travels through curved mirror 220 and transmits through for cleaning by optional circular polarizer 230. This cleaning helps to remove any leaked light having the orthogonal polarization that could cause image ghosting. The collimated light from imaging apparatus 200 is directed through the eye E of the viewer and to an output pupil P2 and, ultimately, to the retina R of the viewer, forming an image as shown.

The pancake optical system of FIG. 2B is a pupil relay apparatus 250 having elements 210, 216, 220, and 230 similar to the FIG. 2A arrangement. In this first embodiment there is air space between the components, thus the term "air pancake" can be applied to this optical arrangement.

Polarizer 210, disposed in the path of light from the scan mirror is formed to transmit incident light of a first polarization, incident at a first angle that is divergent with respect to optical axis OA, toward the curved mirror 220 surface. Polarizer 210 then reflects incident light from mirror 220 of a second polarization that is orthogonal to the first polarization of the transmitted incident light and at a second angle with respect to a normal to the polarizer surface. The polarizer 210 and curved mirror 220 are disposed along the optical path to cooperate, directing the modulated beam to polarizer 210 twice. Polarizer 210 is thus in the path of light to and from the curved mirror 220 and folds the optical path back toward curved mirror 220. The light that exits the polarizer the second time is collimated and directed toward pupil P2 and convergent with respect to an optical axis OA.

Unlike conventional arrangements wherein the pancake configuration forms an eyepiece to collimate the source, embodiments of the present disclosure use the pancake optics to relay the scanning mirror 212 in FIG. 2B to the iris 232 of the observer. This forms a pupil relay where the entrance pupil P1 on FIG. 2A is at the scanning mirror and P2 is the exit pupil at the eye. The pancake pupil magnification here is finite, preferably about −1 (minus one), for example.

The curved image at focal surface 214 and mirror 220 are substantially concentric with respect to pupil P1, defined by curved mirror 220, with image at focal surface 214 and mirror 220 sharing a center or axis of curvature at image generator 212. The axis of rotation of the scan mirror of the image generator 212 and the center of curvature of the curved mirror 220 lie along the same line.

In the context of the present disclosure, two features are considered "substantially concentric" with respect to a pupil P1 or P2 when they share the same common axis of, and center of curvature to within 20% of the larger radial distance of the two curved features, so that any slight difference in distance between their respective centers of curvature is less than 20% of the larger radial distance from that axis or center.

Polarizers 210 and 230 can be, for example, wire grid polarizers, such as devices from Moxtek Inc., Orem, Utah.

The design of the optical path that is defined by the pupil relay optics of the embodiments of the present disclosure is essentially aberration-free. The off-axis beams encounter exactly the same optics as the on-axis beam and thus there are no off axis aberrations such as coma, astigmatism, and distortion which commonly limit the performance of optical systems. Thus, this display system is capable of providing large FOV. According to an embodiment, the system shown in FIGS. 2A and 2B has a FOV of 43 degrees horizontally by 28 degrees vertically.

Note that in both FIGS. 2A and 2B, the retina R is represented ideally as a flat surface, since the eye lens in this model is represented as an ideal paraxial lens. When the eye is represented using a more realistic eye model, the retina is represented as a curved retina.

Figure 2C:
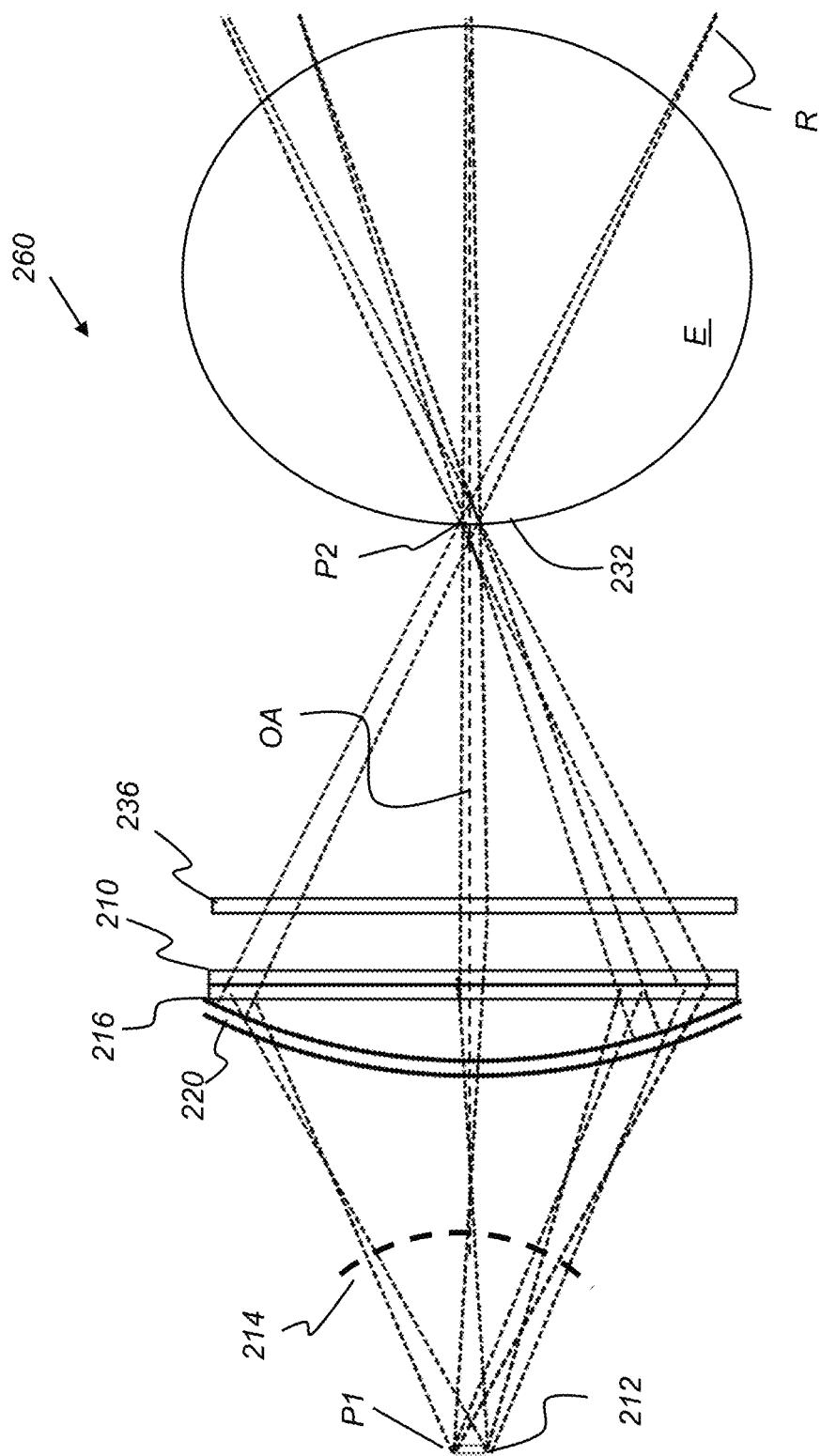
FIG. 2C is a side view of an alternate embodiment of a pupil relay for near-eye viewing.

The embodiment shown in FIGS. 2A and 2B can also be used with the one to one pupil relay with the curvature of mirror 220 reversed along the optical axis OA as shown in FIG. 2C. In pupil relay apparatus 260, the aerial image formed at focal surface 214 is of circularly polarized light. Nominally half of the light is rejected by the semi-transparent curved mirror 220 and half is transmitted. The transmitted portion passes through QWP 216 to become linearly polarized and is thus reflected from reflective polarizer 210 back to the curved mirror 220. This light is collimated and directed back to pupil P2 through polarizer 210, in the orthogonal polarization which transmits through the polarizer 210 towards iris 232. An optional cleaning polarizer 236 can be used to eliminate light of the wrong polarization that may have leaked through the reflective polarizer. Curved mirror 220 has its radius of curvature centered at or centric with pupil P2. As with the FIG. 2A embodiment, the light first incident on polarizer 210 is divergent with respect to optical axis OA. The light incident on polarizer 210 the second time is collimated and direct along optical axis OA.

According to alternate embodiments using the FIGS. 2A-2C arrangement, curved mirror 220 is not a 50-50 semi-transparent mirror, but acts as a curved reflective polarizer, transmitting light of a first polarization and reflecting light of the orthogonal polarization state. Flat reflective polarizer 210 is replaced with a semitransparent mirror. One skilled in the imaging arts can appreciate that additional variations are possible using the curved mirror 220 as reflective polarizer and using a flat, semi-transparent mirror.

Input Optics

The side schematic view of FIG. 3A and unfolded view of FIG. 3B show input optics 240 that pre-focus the light that is directed through polarizer 210 and other components of the pupil relay in various embodiments of the present disclosure. An objective lens 244 is positioned in the path of the generated modulated light beam that is directed to scan mirror 242. Lens 244 conditions the modulated light by expanding the input beam and focusing it to a position between the scan mirror 242 and the pupil relay, defining and forming focal surface 214 (FIGS. 2A, 2B). Objective lens 244 can consist of two elements, in the form of a cemented doublet or spaced apart, as shown subsequently. An off-the-shelf doublet can be used to correct for the axial color of the relay, assuming that three laser beams or more at different wavelengths are used. Since the rest of the system is symmetrical and reflective, and with the axial color corrected by the input optics, there are no axial or lateral color aberrations in this system. With respect to the embodiments shown in FIGS. 2A, 2B, 2C and following, input optics 240 focus the light to form the curved aerial image at focal surface 214. A scanning mirror 242 can be used to fold the optical path and to form a 2-D image from the directed light beam.

By way of example only, FIG. 3C lists surface and lens characteristics for input optics 240 according to an embodiment of the present disclosure.

The light source can be a scanned laser or other solid state light source.

Embodiment #2

FIGS. 4A through 4I show different views of an all-glass pancake configuration for a pupil relay apparatus 450 in an imaging apparatus 400 for near-eye viewing according to an embodiment of the present disclosure. As with the previous embodiment of FIGS. 2A and 2B, apparatus 450 is a finite conjugate pupil relay working at a magnification of about −1. Focal surface 414 and curved input surface 92 of lens L1 are substantially concentric with respect to pupil P1. The output surface 420 of lens L1 and output surface 94 of lens L3 are substantially concentric with respect to pupil P2. In the optical path defined by pupil relay apparatus 450, polarizer 430 receives light of a first polarization that is at a divergent angle with respect to optical axis OA and reflects this light back toward partially reflective curved surface 420 formed on lens L2, which focuses the light. Two transits through QWP 424 change the polarization of the light beam to a second polarization state, orthogonal to the first polarization state at polarizer 430. Polarizer 430 transmits the returned light, now collimated and directed toward pupil P2.

Some or all portions of pupil relay apparatus 450 can be positioned within the object focal length of the eye, 16.7 mm. This capability applies for other pupil relay apparatus embodiments described subsequently.

FIG. 4B lists exemplary lens and polarizer surfaces for imaging apparatus 400 according to an embodiment of the present disclosure.

Figure 4A:
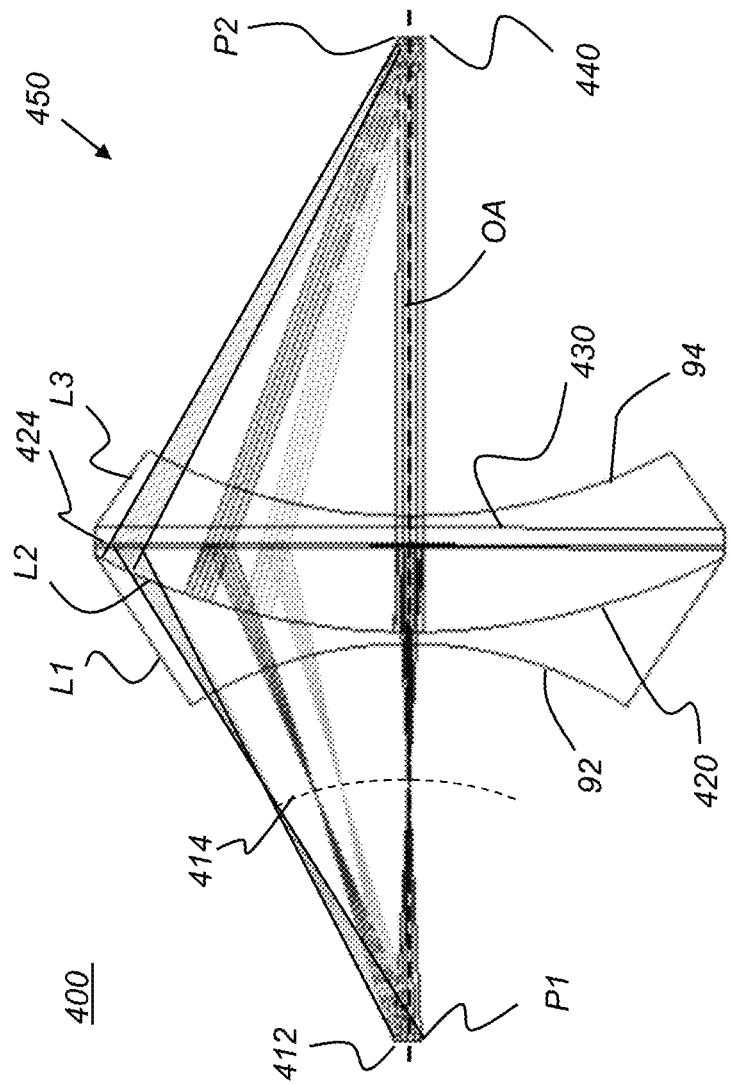
FIG. 4A shows a side view of a configuration for an imaging apparatus for near-eye viewing using a pupil relay with a "pancake" optical configuration.
Figure 4C:
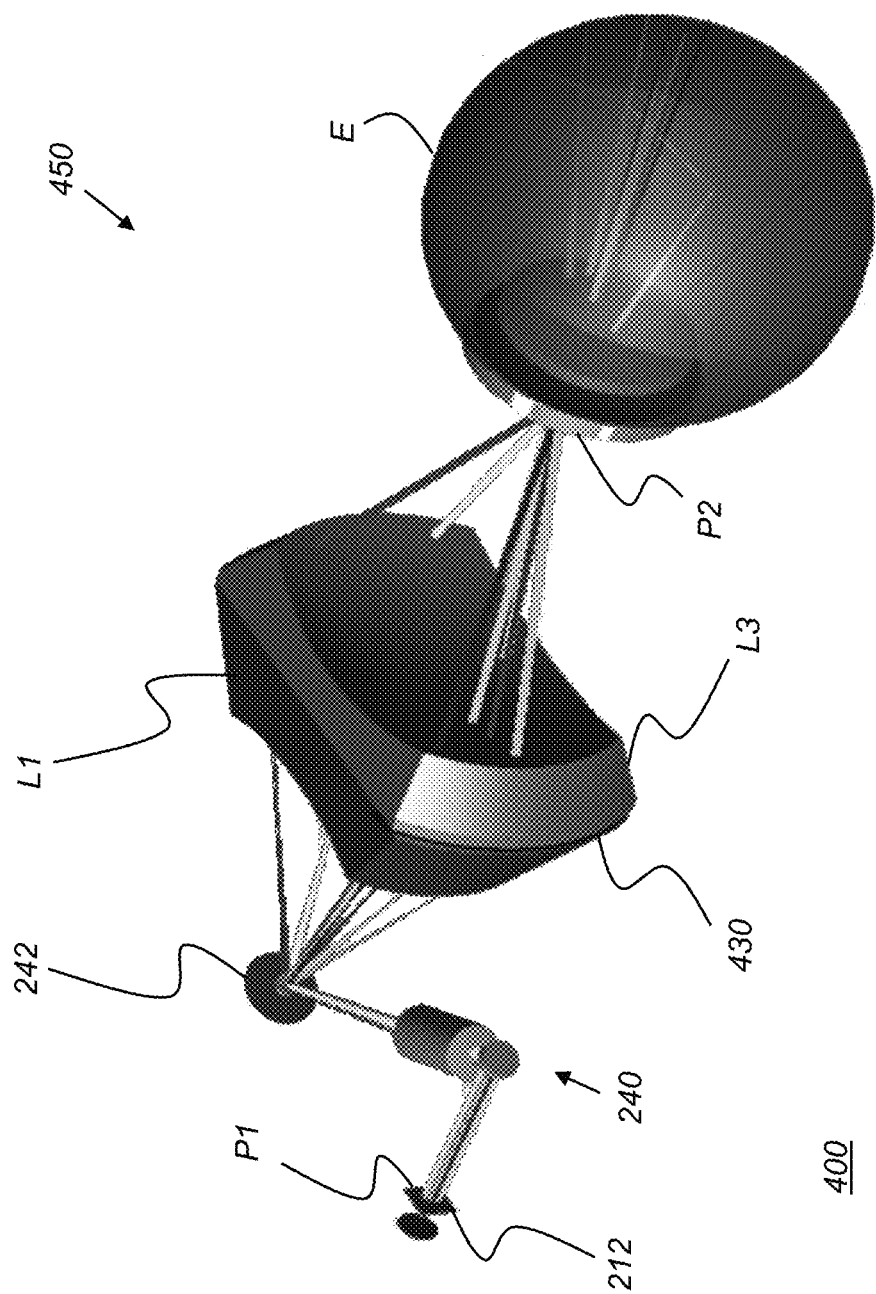
FIG. 4C shows a perspective view of configuration for an imaging apparatus for near-eye viewing using a pupil relay.

FIG. 4C is a perspective view showing imaging apparatus 400 with input optics 240 disposed at one side of scanning mirror 242.

Figure 4D:
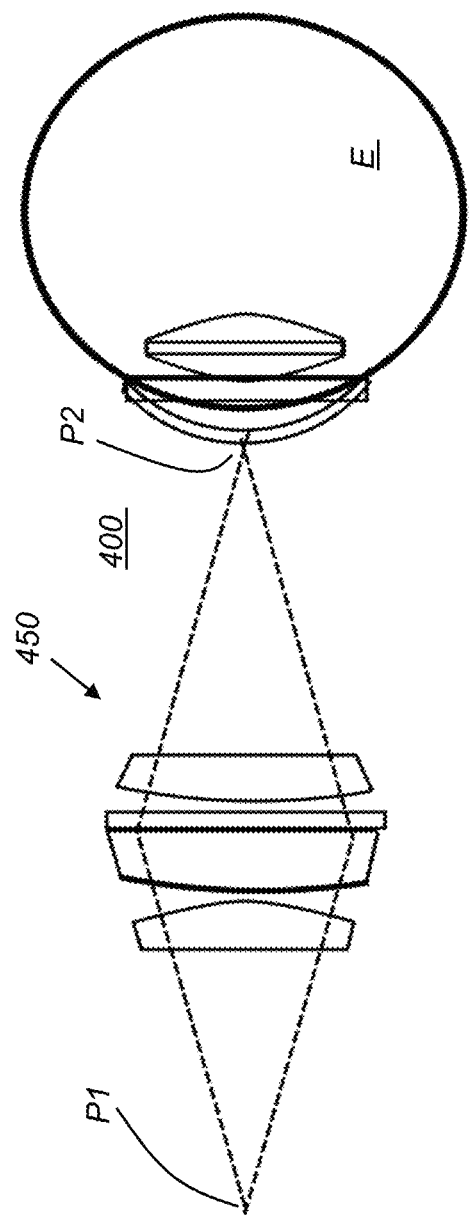
FIG. 4D shows a side view of the configuration of FIG. 4A.

Lenses L1, L2, and L3 may not be spherical in an embodiment of the present disclosure. FIG. 4D shows a vertical view of imaging apparatus 400. Scanning is in the direction orthogonal to the plane of the page.

Figure 4E:
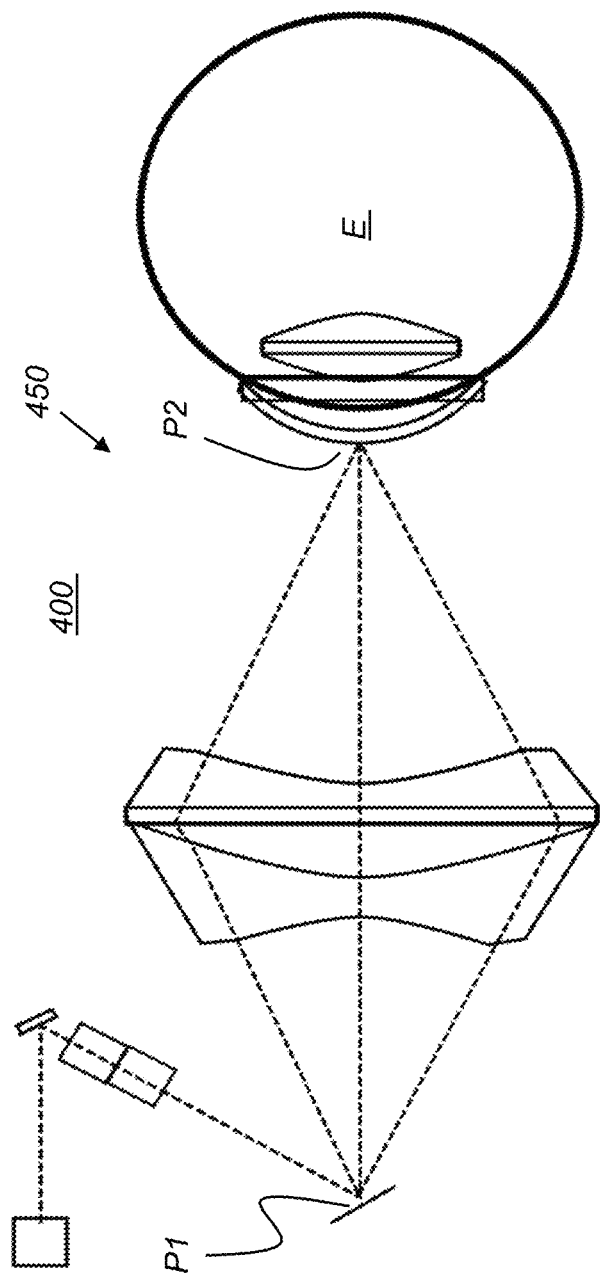
FIG. 4E shows a top view of the configuration of FIG. 4A.

FIG. 4E shows a horizontal view of imaging apparatus 400. Scanning is in the horizontal direction, in the plane parallel to the page.

Figure 4F:
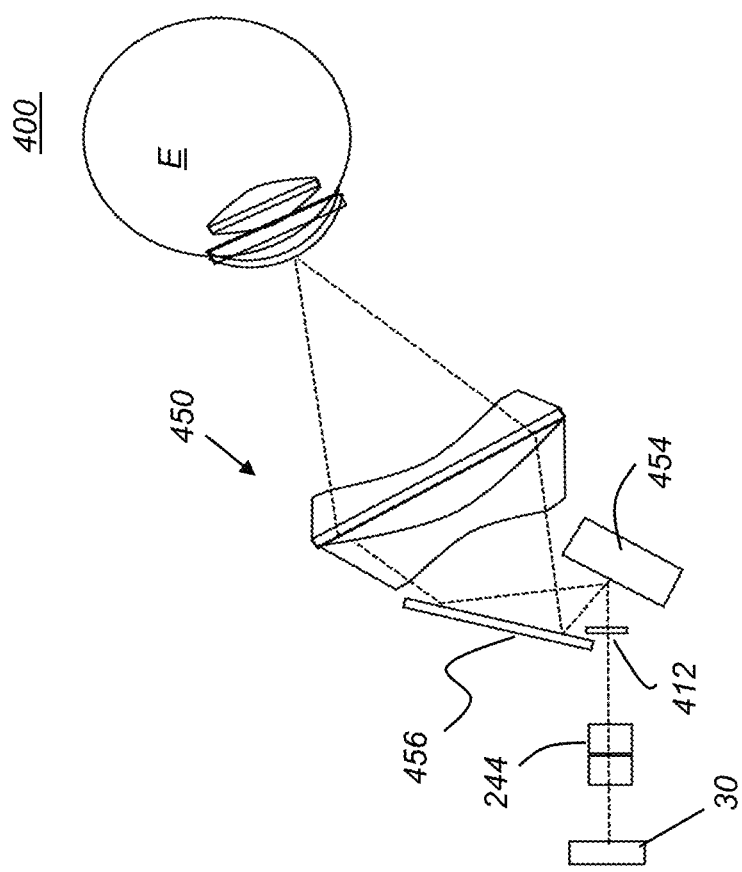
FIG. 4F shows the system with a folded optical path.

As shown in FIG. 4F, the optical path can be folded in order to reduce the overall length and device footprint. Folding mirrors 454, 456 are shown by way of example.

Figure 4G:
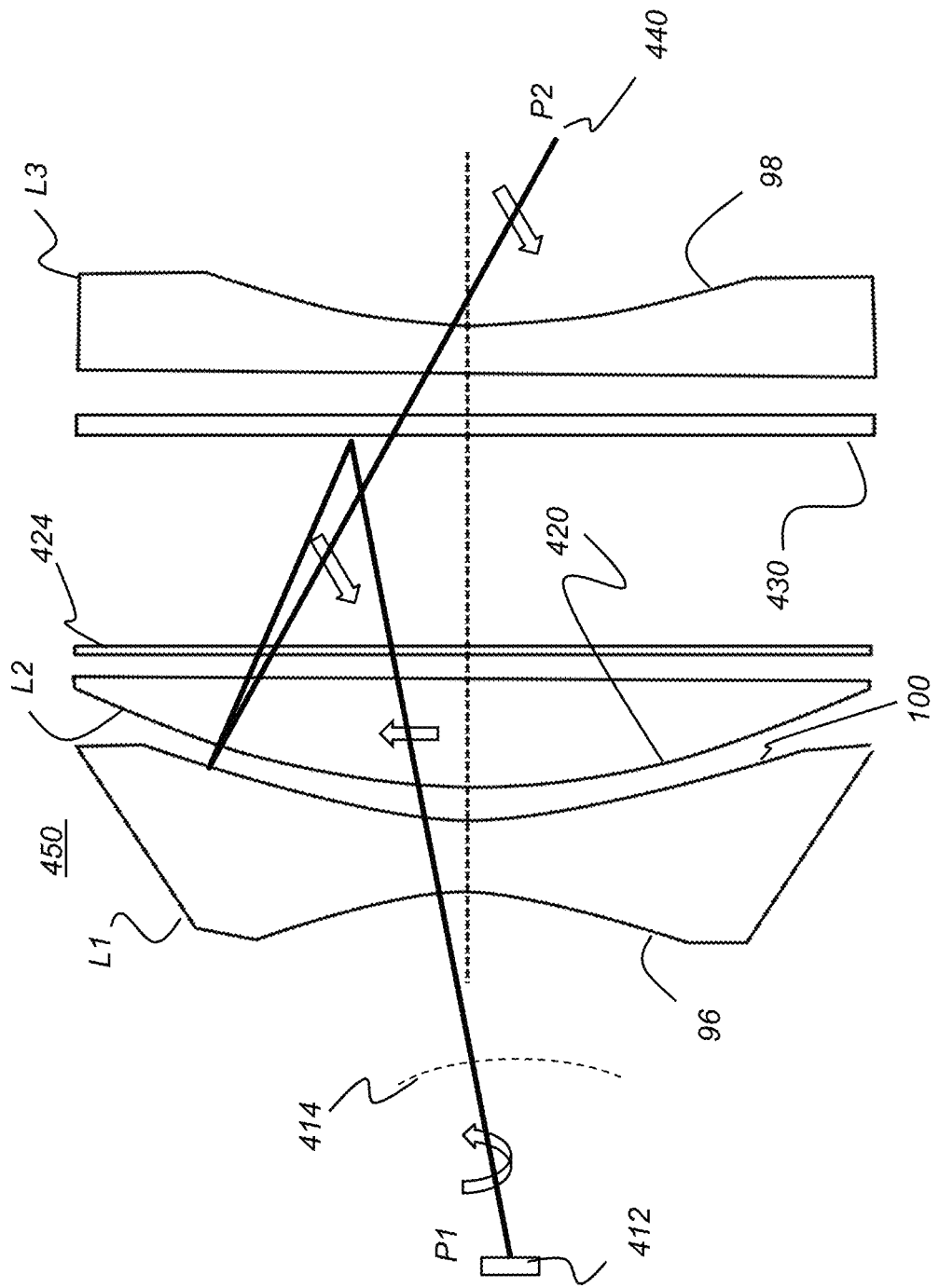
FIG. 4G is an exploded side view of the configuration of FIG. 4A.

FIG. 4G shows an exploded view of the pancake arrangement of pupil relay apparatus 450 of FIG. 4A, showing polarization states along the optical path that is defined by this optical system. Scanning mirror 412 at entrance pupil P1 directs light to form the curved aerial object at focal surface 414. The light is circularly polarized, either being circularly polarized at the input beam or entering as linearly polarized light and rendered to circular polarization by an optional quarter wave plate (QWP) after the scanner mirror 412 (not shown). This light is refracted through first lens L1 and through a partially reflective surface 420 to a second lens L2. The light then goes through quarter waveplate QWP 424 and becomes linearly polarized (shown as vertically polarized in FIG. 4G). This light encounters reflective polarizer 430 and reflects back towards surface 420 passing again through QWP 424. About half of the light is then reflected by the semi-transparent surface 420. The reflection off the curved 420 surface of lens L2 collimates the beam which originated from its focused location as the aerial object at focal surface 414. The collimated light then goes through QWP 424 the third time, and becomes linearly polarized (shown as horizontally polarized light in FIG. 4G.) This light passes through polarizer 430 and a third lens L3. This output light is directed from surface 420 to an iris 440 at exit pupil P2. Optionally a cleaning linear absorptive polarizer (not shown) can be placed between lens L3 and the iris at pupil P2. Focal surface 414 and input surface 96 of lens L1 are substantially concentric with input pupil P1. Output surfaces 98 and 100 and mirror surface 420 are substantially concentric with pupil P2. Iris 440 is at pupil P2. Focal surface 414 is at the front focal surface of mirror 420, reflected through polarizer 430.

Figure 4H:
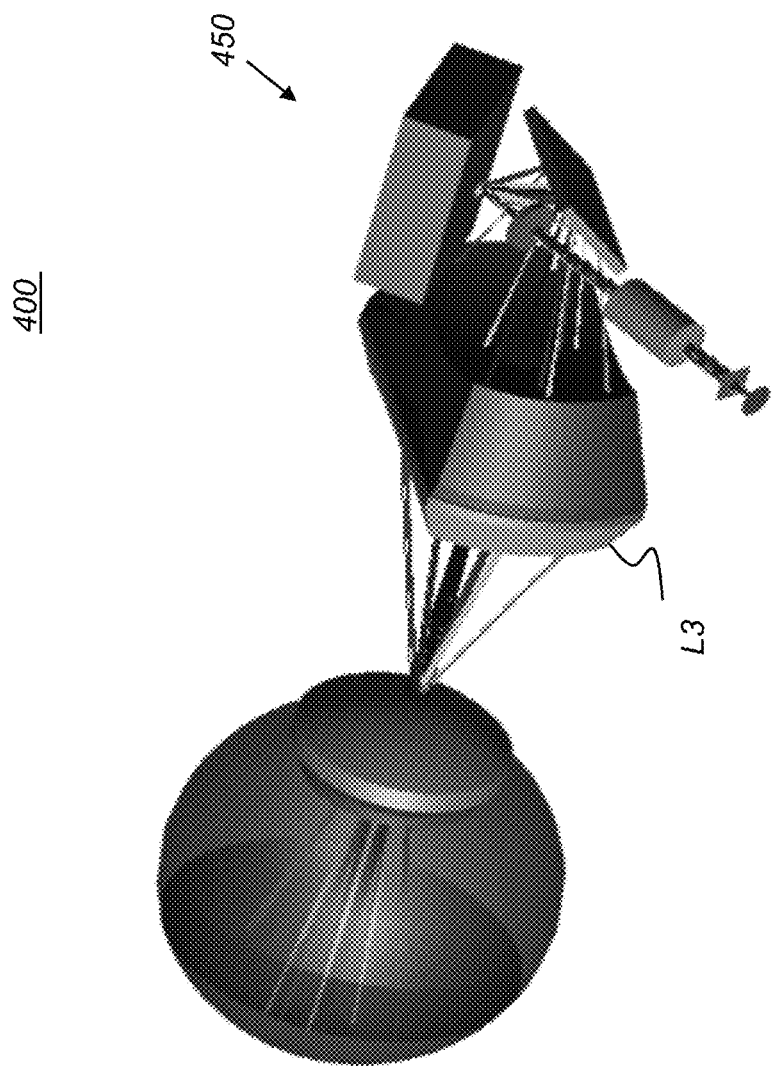
FIG. 4H is a perspective view of the configuration of FIG. 4A.
Figure 4I:
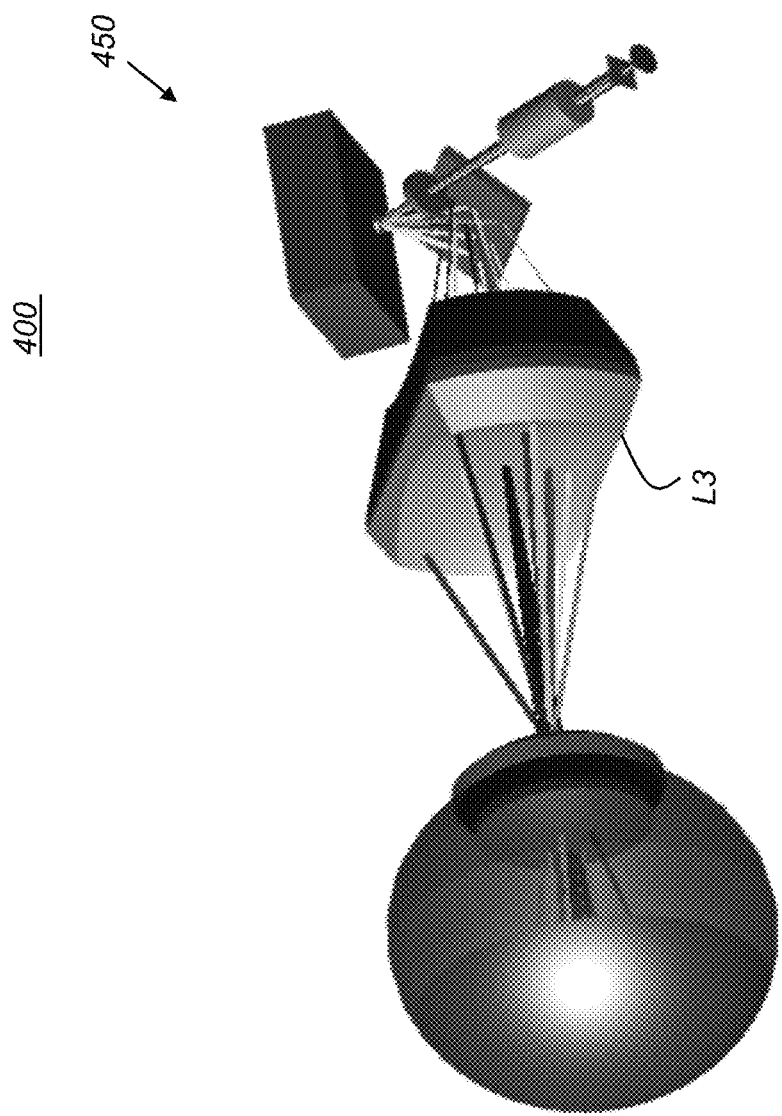
FIG. 4I is a perspective view of the configuration of FIG. 4A.

FIGS. 4H and 4I show perspective views of pupil relay apparatus 450.

Figure 5B:
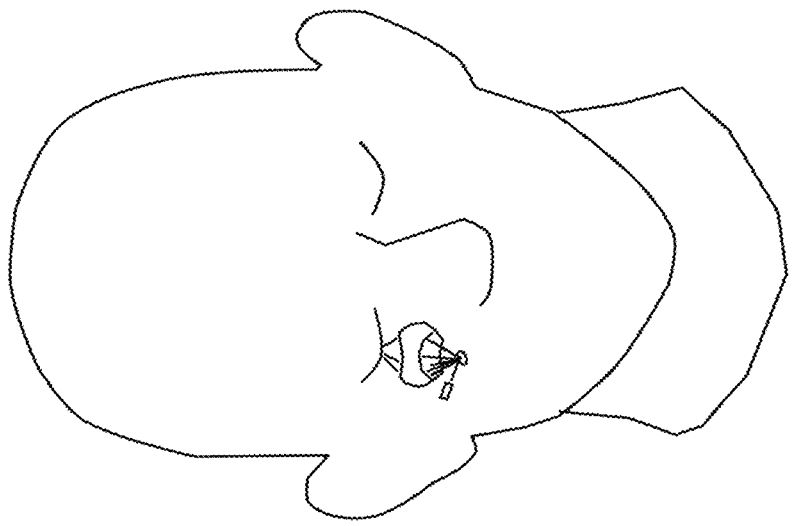
FIGS. 5A and 5B show side and front views, respectively, of an imaging apparatus on the face of a viewer.
Figure 5A:
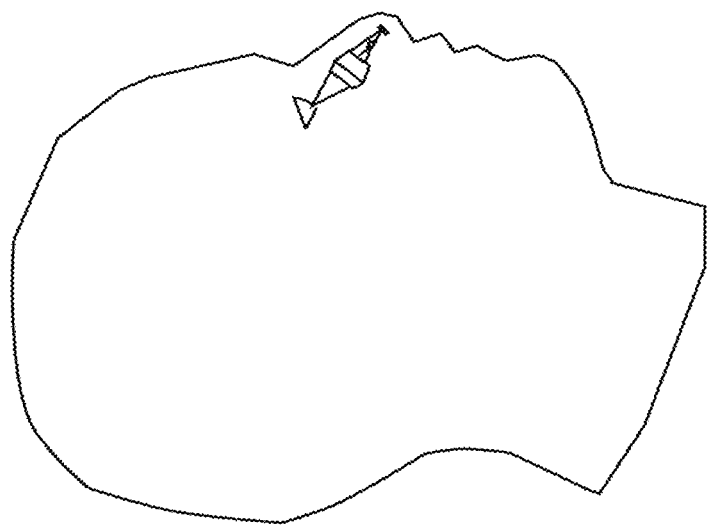

FIGS. 5A and 5B show side and front views, respectively, of imaging apparatus 400 on the face of a viewer. A conventional mount, such as an eyeglass frame, band, or other structure (not shown) can be provided for positioning imaging apparatus 400 near to the viewer's eye, such as within the focal length of the eye lens.

Monocentric Embodiment

Figure 6A:
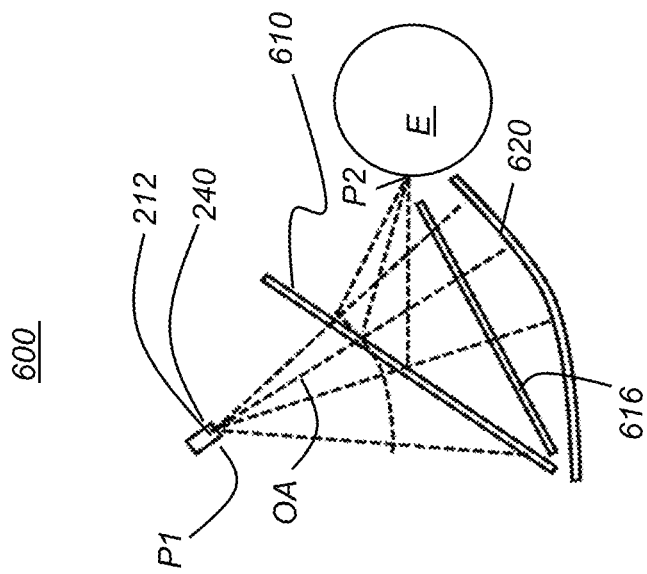
FIGS. 6A and 6B show schematic side views of an imaging apparatus employing a pupil relay according to an alternate embodiment of the present disclosure.
Figure 6B:
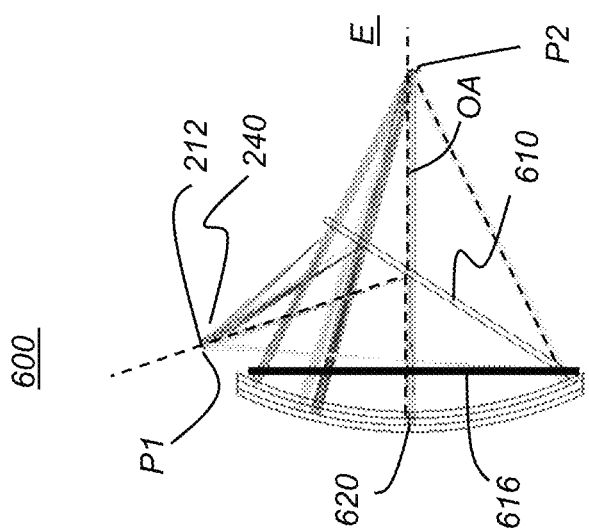

FIGS. 6A and 6B show side schematic views of an imaging apparatus 600 in two configurations. In FIG. 6A, light from image generator 212, the scanning mirror at input pupil P1, is directed by input optics 240 to a diagonal polarizing beam splitter 610 that directs light through a quarter wave plate 616 and to a spherical curved mirror 620 that is concentric with respect to pupil P2. Having transited the QWP 616 twice, light now has polarization orthogonal to that of the input beam. Light transmitted through the PBS 610 is directed to pupil P2, positioned at eye E. As with the FIG. 2A embodiment, the modulated light beam that is initially incident on the polarizer, here polarizing beam splitter 610, is divergent and at a first polarization. Light returning to the polarizing beam splitter 610 is collimated and at a second polarization that is orthogonal to the first polarization.

FIG. 6B is similar to FIG. 6A except that the light from pupil P1 is first transmitted, then reflected from PBS 610.

Figure 6C:
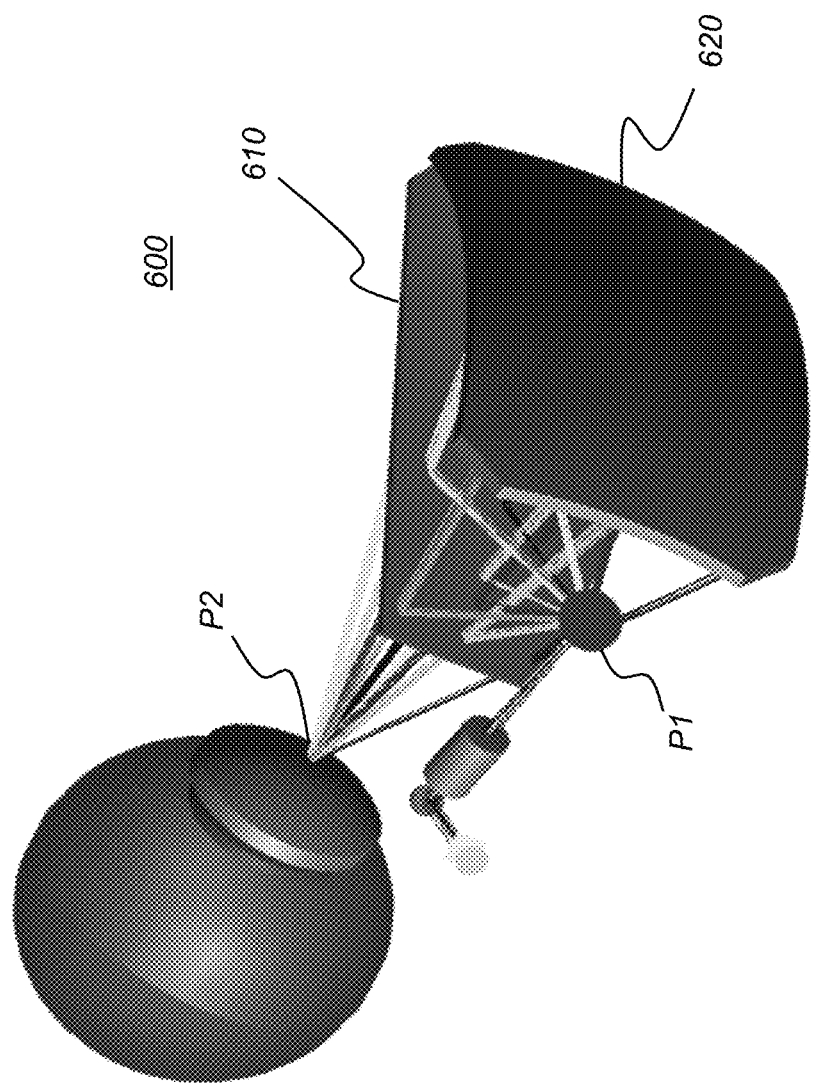
FIG. 6C shows a perspective view of a pupil relay in an imaging apparatus according to another embodiment of the present invention.

FIG. 6C shows a perspective view of imaging apparatus 600.

Figure 6D:
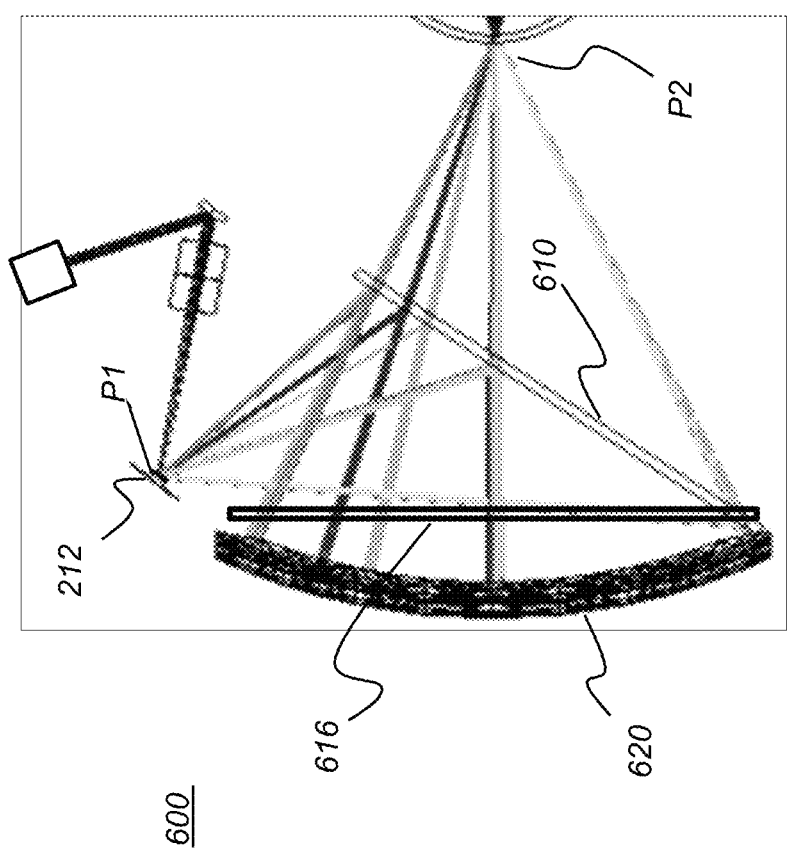
FIG. 6D shows a side view of an imaging apparatus.
Figure 7B:
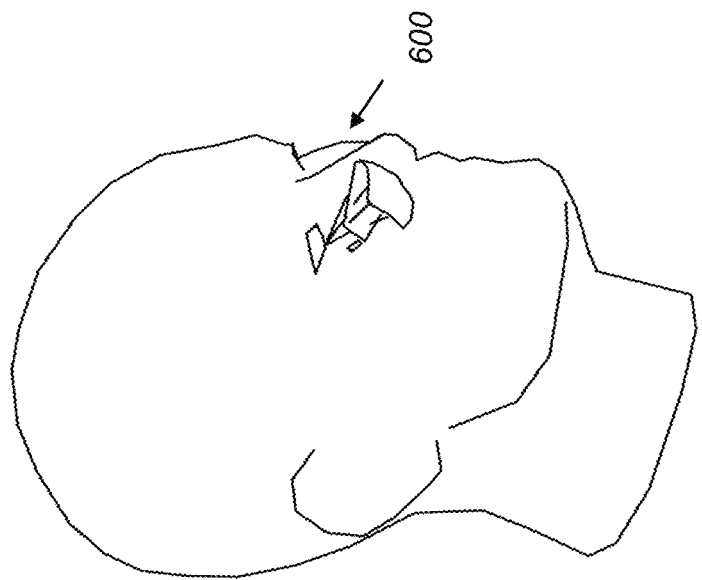
FIGS. 7A-7D show different views of an imaging apparatus relative to the viewer's eye.
Figure 7A:
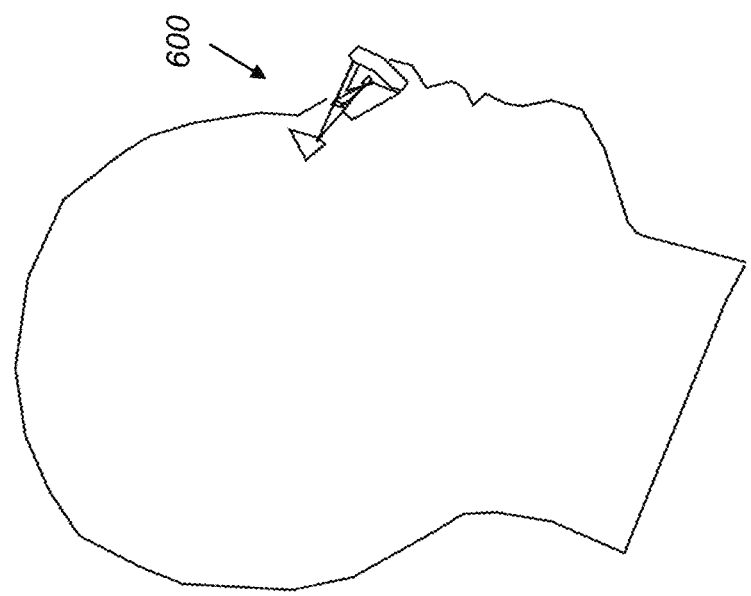
Figure 7D:
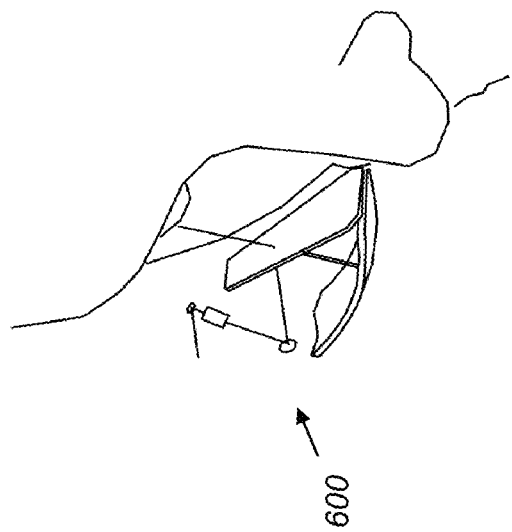
Figure 7C:
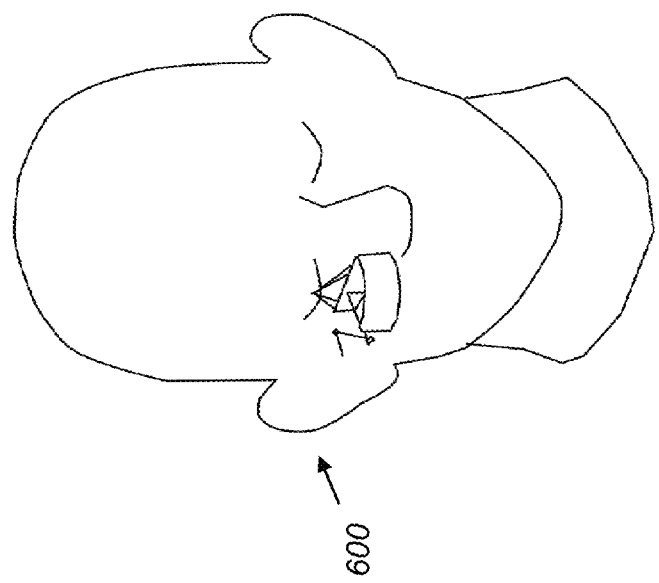

FIG. 6D shows a side view of imaging apparatus 600.

Polarizer 610 can be, for example, a wire grid polarizer, such as a device from Moxtek Inc., Orem, Utah.

The FIG. 6A-6D embodiment is optically monocentric, with both input pupil P1 (image generator 212) and output pupil P2 optically centric with respect to the center of curvature of curved mirror 620. As can be seen from FIGS. 6A and 6B, pupils P1 and P2 are at the same optical position with respect to mirror 620.

FIGS. 7A-7D show different views of imaging apparatus 600 relative to the viewer's eye.

Symmetrical Embodiment

Figure 8A:
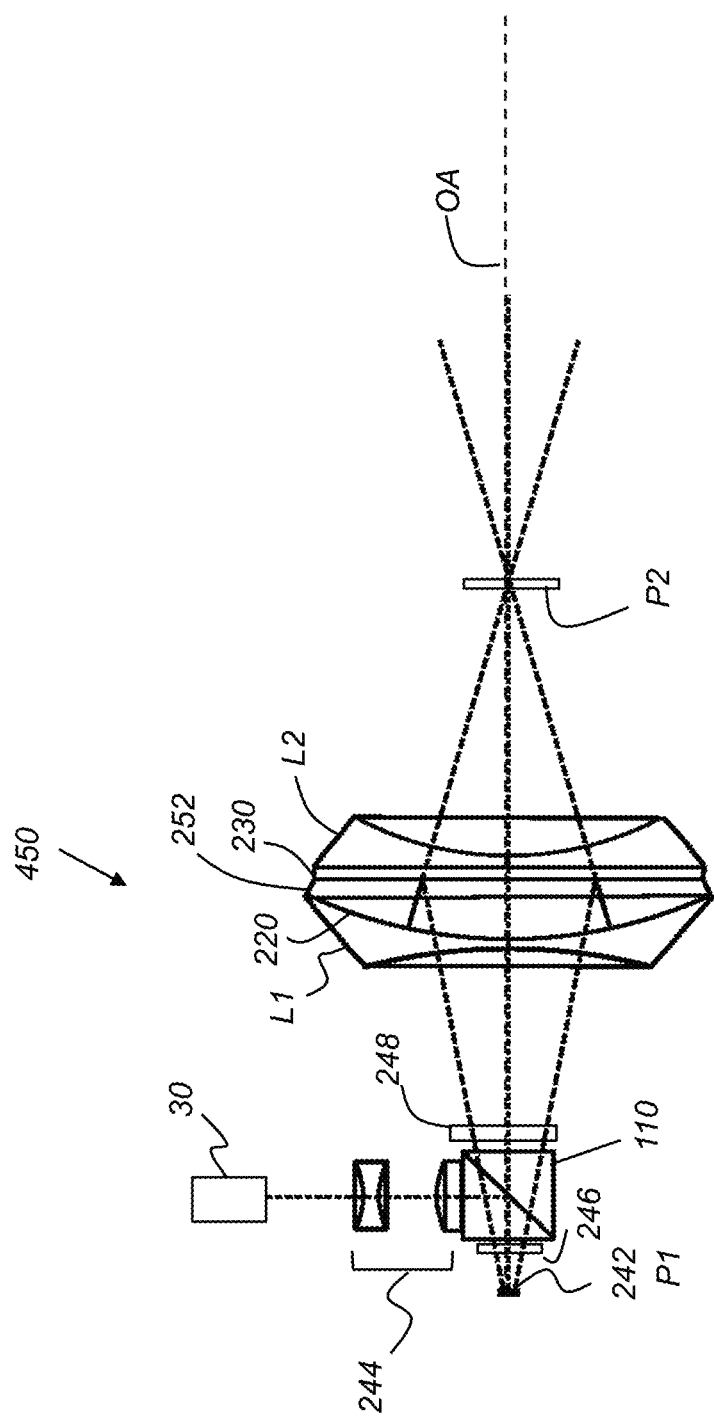
FIG. 8A shows schematic side view of a symmetrical arrangement with a beam splitter used to correct distortion.
Figure 8B:
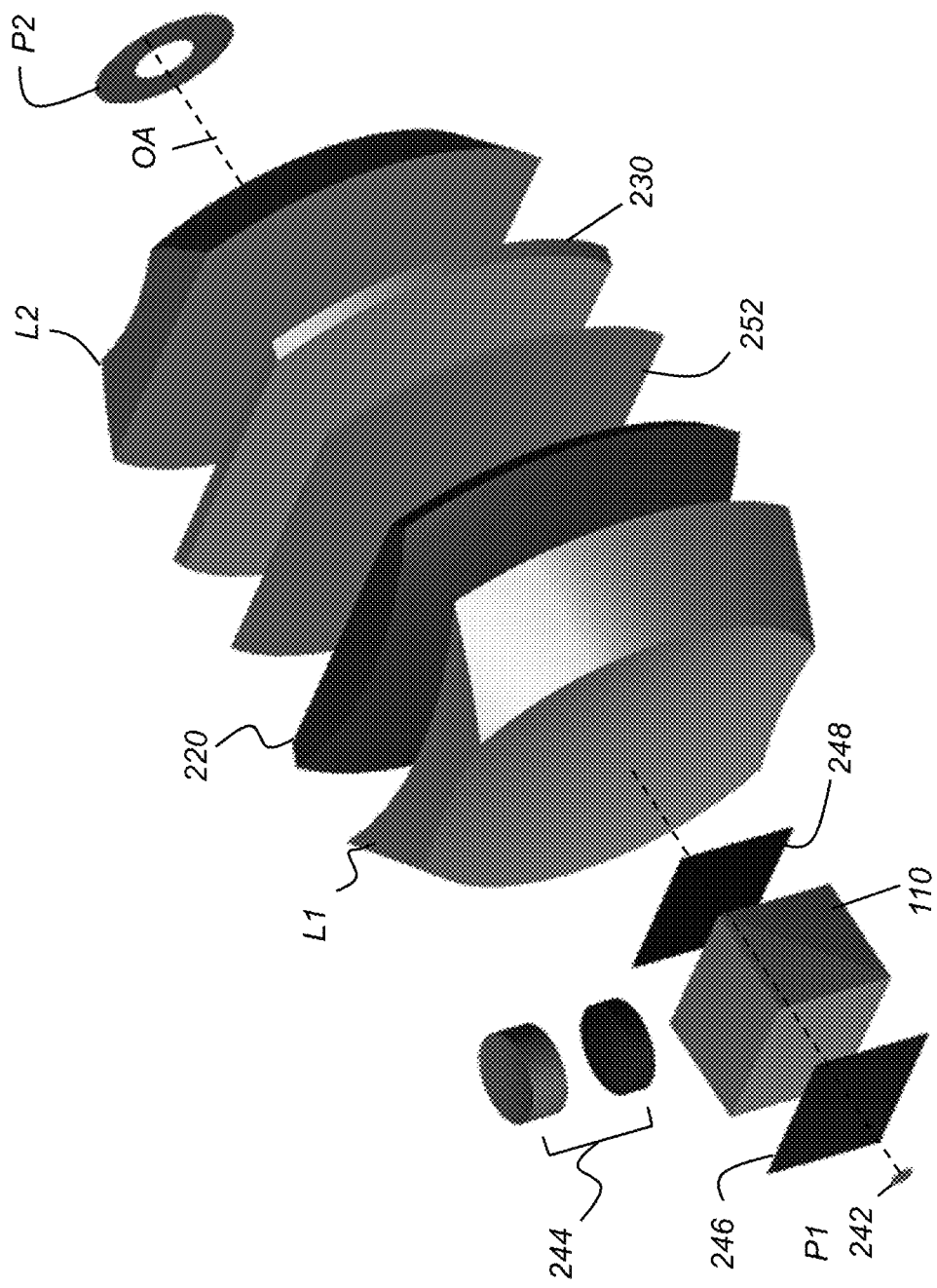
FIG. 8B shows a perspective exploded view of the arrangement of FIG. 8A.
Figure 8D:
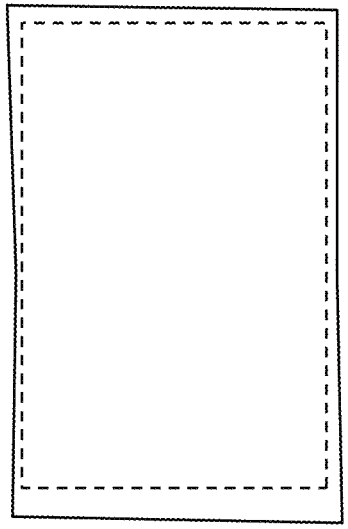
FIG. 8D shows correction achieved for this distortion.
Figure 8C:
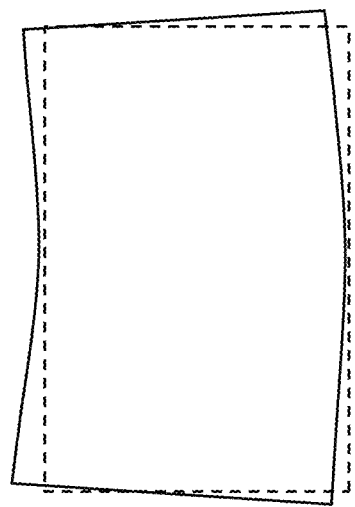
FIG. 8C shows keystone distortion that can occur due to scanning for the embodiment of FIG. 4A if not corrected.

The schematic side view of FIG. 8A and perspective view of FIG. 8B show a symmetrical arrangement modification of the imaging system of 4A, with a beam splitter 110. Beam splitter 110, which can be a polarization beam splitter, helps to correct keystone distortion. When the input beam approaches the scan mirror 242 as in FIG. 4C, at an angle, keystone distortion can be induced, as shown for an outline of the image field in FIG. 8C. FIG. 8C shows uncorrected keystone distortion with a 43 by 25 degree field of view when the incidence angle is 25 degrees from the axis. The dashed line indicates a distortion free field. This distortion can be corrected by electronically modifying the image data sent to the imaging system or by adding a slight aspheric distortion correcting element (not shown) between scan mirror 242 and relay 450 optics. Beam splitter 110 defines a light path with zero angle incidence into scanning mirror 242 and the distortion shown on FIG. 8C is then reduced and made more symmetrical, as shown on FIG. 8D. Objective lens 244 has two lens elements, spaced apart by an air gap. An optional quarter wave plate 246 helps to reduce losses from beam splitter 110 when provided as a polarization beam splitter PBS. A second quarter wave plate 248 changes the light from beam splitter 110 back to circularly polarized light. Mirror 220 can be a semi-transmissive mirror, as mirror surface 420 on FIG. 4A, followed by another quarter wave plate 252. Reflected on-axis light from mirror 220 is reflected from beamsplitter 110 and discarded. Elements L1, mirror 220, quarter wave plate 252, and polarizer 230 may be a single cemented unit. There may be an air gap between the cemented unit and lens L2.

According to an embodiment shown in FIGS. 8A and 8B, the incoming modulated beam from the light module 30 is S-polarized. In the optical path defined by pupil relay apparatus 450, this light is reflected from polarization beam splitter 110 and directed to scan mirror 242 through quarter wave plate (QWP) 246, becoming circularly polarized. The scan mirror 242 reflects the modulated beam back through QWP 246, changing the polarization of the modulated beam to the P-polarization state. P-polarized light is then transmitted through beam splitter 110 and through QWP 248, which changes the polarization state to circularly polarized. This light is conveyed through lens L1. A portion of the light is reflected back along the optical axis OA from semi-transmissive mirror 220. This reflected light again transits QWP 248 and becomes S-polarized, so that it is reflected from beam splitter 110 and discarded. The portion of the modulated beam that transmits through semi-transmissive mirror 220, meanwhile, goes through another QWP 252, which changes its polarization to S-polarization state. This divergent light is reflected by polarizer 230 and is then reflected from mirror 220, now collimated and directed toward pupil P2. The collimated, modulated light, upon transiting QWP 252 a second time, is changed to P-polarization and transmits through polarizer 230 and to output lens L2.

The apparatus of the present disclosure provides an optical apparatus that is suited for virtual reality (VR) or augmented reality (AR) viewing, as well as for mixed reality and smart glass viewing. The imaging arrangement is essentially aberration free due to its optical symmetry. The apparatus is distinct from AR or VR optical configurations based on the use of an eyepiece, such as using catoptric optics, as well as from refractive optics systems that collimate and magnify an image source such as an LCOS (Liquid crystal on silicon) display or a device that forms an image using an array of micromirror devices.

An embodiment of the present disclosure provides an FOV of at least about 40 degrees along the horizontal axis. Because it provides a relatively narrow beam of light, the imaging apparatus of the present disclosure can require eye tracking hardware to detect viewer eye movement. Corresponding correction can be provided to compensate for eye movement.

According to an embodiment of the present disclosure, there is provided an optical apparatus for near-eye viewing comprising: a laser light source energizable to direct a beam to a scan mirror; a curved mirror surface optically concentric with the scan mirror and partially transmissive; a first polarizer disposed between the scan mirror and the curved mirror surface, the first polarizer having a first polarization axis; a quarter wave plate disposed between the polarizer and the curved mirror surface; and a second polarizer disposed downstream from the curved mirror and having a second polarization axis that is orthogonal to the first polarization axis.

The term "exemplary" is used herein to mean "serving as an example, instance, or illustration." Any aspect described herein as "exemplary" is not necessarily to be construed as preferred or advantageous over other aspects.

The invention has been described in detail with particular reference to a presently preferred embodiment, but it will be understood that variations and modifications can be effected within the spirit and scope of the invention. For example, although the above description concentrates on forming an image for one eye, it can be readily understood that corresponding elements and logic are used for forming the stereoscopic images needed to form and coordinate image content for both right- and left-eye images, using methods familiar to those skilled in the stereoscopic imaging arts. The images that are formed can be stereoscopic or biocular, that is, with the same image content provided to both eyes for monoscopic display.

The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An optical apparatus worn by a viewer and comprising:
    a laser light source energizable to direct a modulated beam toward a scan mirror;
    an objective lens in the path of the modulated beam directed toward the scan mirror,
    wherein the objective lens and the scan mirror define a curved focal surface for the modulated beam;
    pupil relay optics disposed to relay a first pupil at the scan mirror to a second pupil at an eye lens of the viewer, the pupil relay optics defining an optical path between the first and second pupils, the optical path comprising:
        (i) a curved mirror surface disposed to transmit substantially half of the light incident from the modulated beam and that has a first center of curvature at the first pupil;
        (ii) a first polarizer disposed in the optical path to receive light from the scan mirror and formed to reflect incident light of a first polarization toward the curved mirror surface and to transmit incident light of a second polarization, orthogonal to the first polarization, wherein the optical path defined by the pupil relay optics directs the modulated light beam twice to the first polarizer, and wherein the modulated light beam incident the second time on the first polarizer is collimated and directed toward the second pupil;
        and
        (iv) a quarter wave retarder disposed between the first polarizer and the curved mirror surface.

2. The optical apparatus of claim 1 wherein the pupil relay optics further comprise a second polarizer disposed in the path of the modulated light and formed to reflect incident light of the first polarization and transmit incident light of the second polarization.

3. The optical apparatus of claim 1 wherein the pupil relay optics further comprise a second polarizer disposed in the path of the modulated light and formed to reflect incident light of the first polarization and transmit incident light of the second polarization.

4. The optical apparatus of claim 1 wherein the first polarizer is a polarization beam splitter.

5. The optical apparatus of claim 1 wherein the first polarizer is a wire-grid polarizer.

6. The optical apparatus of claim 1 wherein the focal surface is concentric with the curved mirror surface.

7. The optical apparatus of claim 1 wherein the curved mirror surface, polarizer, and quarter wave retarder are formed as part of a single unit.

8. The optical apparatus of claim 1 wherein the curved mirror surface is further optically centric with the second pupil.

9. The optical apparatus of claim 1 wherein one or more of the pupil relay optics are configured to be disposed within an object focal length of an eye lens of the viewer.

10. An optical apparatus worn by a viewer and comprising:
    a laser light source energizable to direct a modulated beam through an objective lens and toward a beam splitter, wherein the beam splitter directs a portion of the beam to a scan mirror, wherein the objective lens and the scan mirror define a curved focal surface for the modulated beam;
    pupil relay optics disposed to relay a first pupil at the scan mirror to a second pupil at an eye lens of the viewer, the pupil relay optics defining an optical path that extends along an optical axis between the first and second pupils and comprising:
        (i) a first lens in the path of light from the curved focal surface;
        (ii) a curved mirror surface that transmits substantially half of the light incident from the modulated beam and that has a first center of curvature at the second pupil;
        (iii) a first polarizer disposed in the path of light from the scan mirror and formed to reflect incident light of a first polarization and at a convergent angle with respect to the optical axis toward the curved mirror surface and to transmit incident light of a second polarization, wherein the second polarization is orthogonal to the first polarization, and wherein the modulated light beam incident the second time on the first polarizer is collimated and directed toward the second pupil; and
        (iv) a first quarter wave plate disposed between the first polarizer and the curved mirror surface.

11. The optical apparatus of claim 10 wherein the beam splitter is a polarization beam splitter.

12. The optical apparatus of claim 11 further comprising a second quarter wave plate disposed in the path of light between the beam splitter and the scan mirror.

13. The optical apparatus of claim 10 further comprising a second quarter wave plate disposed along the optical axis between the beam splitter and the first lens.

14. The optical apparatus of claim 10 wherein the light from the laser light source is circularly polarized.

15. An optical apparatus worn by a viewer and comprising:
- a laser light source energizable to direct a modulated beam through an objective lens and to a scan mirror to form a curved image; and
- pupil relay optics disposed to relay a first pupil at the scan mirror to a second pupil at an eye lens of the viewer, the pupil relay optics comprising:
  - (i) a first polarizer disposed in the path of light from the scan mirror and formed to reflect incident light of a first polarization and to transmit incident light of a second polarization, orthogonal to the first polarization, and wherein light incident a second time on the first polarizer is collimated and directed toward the second pupil;
  - (ii) a curved mirror surface that transmits substantially half of the light incident from the first polarizer, wherein both the first and second pupils are optically centric with respect to a center of curvature of the curved mirror surface and wherein the curved image is formed at a focal surface of the curved mirror; and
  - (iii) a quarter wave plate in the path of light between the first polarizer and the curved mirror.

16. The optical apparatus of claim 15 further comprising a mount that disposes some portion or all of the pupil relay optics within an object focal length of an eye lens of the viewer.

\* \* \* \* \*

UNITED STATES PATENT AND TRADEMARK OFFICE
CERTIFICATE OF CORRECTION

| | | |
|---|---|---|
| PATENT NO. | : 10,816,795 B2 | Page 1 of 1 |
| APPLICATION NO. | : 15/822288 | |
| DATED | : October 27, 2020 | |
| INVENTOR(S) | : David Kessler et al. | |

It is certified that error appears in the above-identified patent and that said Letters Patent is hereby corrected as shown below:

In the Claims

Column 17, Line 64, In Claim 1, should read:
"(iii) a quarter wave retarder disposed between the first"

Signed and Sealed this
Twenty-eighth Day of February, 2023

Katherine Kelly Vidal
*Director of the United States Patent and Trademark Office*